(12) United States Patent
Martin et al.

(10) Patent No.: US 11,533,457 B2
(45) Date of Patent: Dec. 20, 2022

(54) SMART HOME AND SECURITY SYSTEM

(71) Applicant: AOB Products Company, Columbia, MO (US)

(72) Inventors: Kyle Martin, Columbia, MO (US); Brian Steere, Columbia, MO (US); Michael Cottrell, Ashland, MO (US); Fernando Coviello, Columbia, MO (US); James Tayon, Moberly, MO (US); Tony Galbreath, Columbia, MO (US); Curtis Smith, Columbia, MO (US); Timothy S. Kinney, Warrenton, MO (US); Matthew Kinamore, Columbia, MO (US); Anthony Vesich, Columbia, MO (US); Mark Dalton, Columbia, MO (US); Justin Burke, Columbia, MO (US); Dennis W. Cauley, Jr., Fayette, MO (US); Seth Wheeler, Columbia, MO (US); Michael Lindsay, Columbia, MO (US); Ryan Varnum, Columbia, MO (US)

(73) Assignee: AOB PRODUCTS COMPANY, Columbia, MO (US)

( * ) Notice: Subject to any disclaimer, the term of this patent is extended or adjusted under 35 U.S.C. 154(b) by 0 days.

(21) Appl. No.: 17/104,462

(22) Filed: Nov. 25, 2020

(65) Prior Publication Data
US 2021/0160461 A1 May 27, 2021

Related U.S. Application Data

(60) Provisional application No. 63/060,277, filed on Aug. 3, 2020, provisional application No. 62/941,298, filed on Nov. 27, 2019.

(51) Int. Cl.
*H04N 7/18* (2006.01)
*G06K 9/00* (2006.01)
(Continued)

(52) U.S. Cl.
CPC ............ *H04N 7/188* (2013.01); *G06V 20/40* (2022.01); *G08B 21/20* (2013.01); *G08B 25/10* (2013.01);
(Continued)

(58) Field of Classification Search
CPC .... H04N 7/188; H04N 7/186; G06K 9/00711; G06K 2009/00738; G08B 21/20;
(Continued)

(56) References Cited

U.S. PATENT DOCUMENTS 4,337,462 A 6/1982 Lemelson
6,535,110 B1 3/2003 Arora et al.
(Continued)

OTHER PUBLICATIONS

Liberty Safelert Setup Guide, downloaded from www.Manualslib.com, copyright date 2015, 2 pages.
(Continued)

*Primary Examiner* — Jared Walker
(74) *Attorney, Agent, or Firm* — Stinson LLP

(57) ABSTRACT

A security and smart home system, components thereof, and associated methods. The system can include a host-carried monitor configured to monitor data associated with the host, such as motion data, position data, temperature data, or humidity data. The system can include one or more security devices located at a premises to monitor security data at the premises, with the one or more security devices in communication with a remote server programmed to process security event signals from the one or more security devices and transmit action instructions to the one or more security devices. Security devices can include an electrical power switch, an electrical power plug, and a camera.

61 Claims, 33 Drawing Sheets

(51) Int. Cl.
  *G08B 21/20* (2006.01)
  *H04L 12/28* (2006.01)
  *G08B 25/10* (2006.01)
  *G06V 20/40* (2022.01)

(52) U.S. Cl.
  CPC .......... *H04L 12/2825* (2013.01); *G06V 20/44* (2022.01); *H04L 2012/2841* (2013.01)

(58) Field of Classification Search
  CPC ...... G08B 25/10; G08B 25/008; G08B 25/14; H04L 12/2825; H04L 2012/2841
  See application file for complete search history.

(56) References Cited

U.S. PATENT DOCUMENTS

| | | | |
|---|---|---|---|
| 7,113,091 | B2 | 9/2006 | Script et al. |
| 7,394,381 | B2 | 7/2008 | Hanson et al. |
| 7,554,320 | B2 | 6/2009 | Kagan |
| 7,554,445 | B2 | 6/2009 | Script et al. |
| 7,936,271 | B2 | 5/2011 | Karr et al. |
| 8,013,744 | B2 | 9/2011 | Tsai et al. |
| 8,050,206 | B2 | 11/2011 | Siann et al. |
| 8,138,626 | B2 | 3/2012 | Jonsson et al. |
| 8,217,789 | B2 | 7/2012 | Script |
| 8,255,090 | B2 | 8/2012 | Frader-Thompson et al. |
| 8,334,906 | B2 | 12/2012 | Lipton et al. |
| 8,503,539 | B2 | 8/2013 | Fran |
| 8,548,607 | B1 | 10/2013 | Belz et al. |
| 8,578,001 | B2 | 11/2013 | Young et al. |
| 8,587,648 | B2 | 11/2013 | Olsson et al. |
| 8,610,305 | B2 | 12/2013 | Sarid et al. |
| 8,634,476 | B2 | 1/2014 | Tran |
| 8,718,718 | B2 | 5/2014 | Leung |
| 8,768,141 | B2 | 7/2014 | Chan |
| 8,822,924 | B2 | 9/2014 | Valentino et al. |
| 8,849,596 | B2 | 9/2014 | Ting et al. |
| 8,872,390 | B2 | 10/2014 | Buchheim et al. |
| 8,902,315 | B2 | 12/2014 | Fisher et al. |
| 8,996,188 | B2 | 3/2015 | Frader-Thompson et al. |
| 9,013,283 | B1 | 4/2015 | Tackaberry |
| 9,080,782 | B1 | 7/2015 | Sheikh |
| 9,113,051 | B1 | 8/2015 | Scalisi |
| 9,117,251 | B2 | 8/2015 | Schmidt et al. |
| 9,179,058 | B1 | 11/2015 | Zeira et al. |
| 9,179,105 | B1 | 11/2015 | Zeira et al. |
| 9,207,659 | B1 | 12/2015 | Sami |
| 9,219,361 | B1 | 12/2015 | Wine et al. |
| 9,224,096 | B2 | 12/2015 | Oppenheimer |
| 9,231,351 | B2 | 1/2016 | Chung et al. |
| 9,270,116 | B2 | 2/2016 | Adams |
| 9,277,105 | B2 | 3/2016 | Olsson et al. |
| 9,328,857 | B2 | 5/2016 | Conte et al. |
| 9,329,650 | B2 | 5/2016 | Paul et al. |
| 9,360,682 | B1 | 6/2016 | Edwards |
| 9,408,268 | B2 | 8/2016 | Recker et al. |
| 9,438,865 | B2 | 9/2016 | Renkis |
| 9,439,045 | B2 | 9/2016 | Kingsmill et al. |
| 9,443,366 | B2 | 9/2016 | Rayner |
| 9,456,131 | B2 | 9/2016 | Tran |
| 9,460,596 | B1 | 10/2016 | Moses |
| 9,489,745 | B1 | 11/2016 | Heitz, III et al. |
| 9,526,153 | B2 | 12/2016 | Noori et al. |
| 9,576,166 | B2 | 2/2017 | Burch, V et al. |
| 9,576,466 | B2 | 2/2017 | Sager et al. |
| 9,578,234 | B2 | 2/2017 | Tran |
| 9,588,534 | B2 | 3/2017 | Chapel et al. |
| 9,589,436 | B2 | 3/2017 | Herman et al. |
| 9,591,267 | B2 | 3/2017 | Lipton et al. |
| 9,596,098 | B1 | 3/2017 | Djakovic et al. |
| 9,626,849 | B2 | 4/2017 | Dixon et al. |
| 9,648,277 | B2 | 5/2017 | Edwards |
| 9,672,705 | B2 | 6/2017 | Modi et al. |
| 9,690,272 | B2 | 6/2017 | Chin et al. |
| 9,697,709 | B2 | 7/2017 | King et al. |
| 9,699,281 | B2 | 7/2017 | Fisher et al. |
| 9,749,595 | B2 | 8/2017 | Lo et al. |
| 9,755,459 | B2 | 9/2017 | Wiggins |
| 9,767,249 | B1 | 9/2017 | Belz et al. |
| 9,769,420 | B1 | 9/2017 | Moses |
| 9,819,226 | B2 | 11/2017 | Yang et al. |
| 9,819,713 | B2 | 11/2017 | Siminoff et al. |
| 9,830,795 | B2 | 11/2017 | Kay |
| 9,836,945 | B2 | 12/2017 | Kramer et al. |
| 9,852,388 | B1 | 12/2017 | Swieter et al. |
| 9,860,352 | B2 | 1/2018 | Fisher et al. |
| 9,876,357 | B2 | 1/2018 | Paul et al. |
| 9,883,085 | B2 | 1/2018 | Piednoir |
| 9,913,352 | B2 | 3/2018 | Noori et al. |
| 9,915,991 | B2 | 3/2018 | Zhang et al. |
| 9,916,755 | B1 | 3/2018 | Ratti |
| 9,942,525 | B2 | 4/2018 | Duffy et al. |
| 9,954,381 | B2 | 4/2018 | AbuEideh |
| 10,009,519 | B2 | 6/2018 | Olsson et al. |
| 10,017,963 | B2 | 7/2018 | Johnson et al. |
| 10,031,911 | B2 | 7/2018 | Sharma et al. |
| 10,032,354 | B2 | 7/2018 | Kay |
| 10,034,359 | B2 | 7/2018 | Recker et al. |
| 10,037,662 | B2 | 7/2018 | King et al. |
| 10,061,288 | B2 | 8/2018 | Jablokov et al. |
| 10,062,533 | B2 | 8/2018 | Qureshi et al. |
| 10,069,332 | B2 | 9/2018 | Cook |
| 10,072,942 | B2 | 9/2018 | Wootton et al. |
| 10,083,599 | B2 | 9/2018 | Sager et al. |
| 10,117,309 | B1 | 10/2018 | Fu et al. |
| 10,121,028 | B2 | 11/2018 | Sengstaken, Jr. |
| 10,135,628 | B2 | 11/2018 | Imes et al. |
| 10,194,279 | B2 | 1/2019 | Kingsmill et al. |
| 10,194,296 | B2 | 1/2019 | Tetreault et al. |
| 10,209,727 | B2 | 2/2019 | Chapel et al. |
| 10,211,999 | B2 | 2/2019 | Pelton et al. |
| 10,230,880 | B2 | 3/2019 | Chien |
| 10,264,170 | B2 | 4/2019 | Chien |
| 10,277,785 | B2 | 4/2019 | Kraz et al. |
| 10,290,198 | B2 | 5/2019 | Kay |
| 10,290,447 | B2 | 5/2019 | Qureshi et al. |
| 10,291,065 | B2 | 5/2019 | Chan et al. |
| 10,296,794 | B2 | 5/2019 | Ratti |
| 10,304,319 | B2 | 5/2019 | Sager et al. |
| 10,311,689 | B1 | 6/2019 | Meganathan et al. |
| 10,326,247 | B2 | 6/2019 | Kohen |
| 10,332,384 | B1 | 6/2019 | Schryer et al. |
| 10,339,773 | B2 | 7/2019 | Kennedy et al. |
| 10,349,149 | B2 | 7/2019 | Gelonese et al. |
| 10,366,588 | B2 | 7/2019 | Slavin et al. |
| 10,383,072 | B2 | 8/2019 | Do et al. |
| 10,389,546 | B2 | 8/2019 | Djakovic et al. |
| 10,389,982 | B1 | 8/2019 | Fu et al. |
| 10,389,983 | B1 | 8/2019 | Fu et al. |
| 10,394,227 | B2 | 8/2019 | Michalscheck et al. |
| 10,419,540 | B2 | 9/2019 | Arora et al. |
| 10,424,189 | B2 | 9/2019 | Daoura et al. |
| 10,425,241 | B2 | 9/2019 | Kim et al. |
| 10,436,615 | B2 | 10/2019 | Agarwal et al. |
| 10,447,037 | B2 | 10/2019 | Hall et al. |
| 10,448,211 | B1 | 10/2019 | Shen et al. |
| 2003/0020611 | A1 | 1/2003 | Script et al. |
| 2008/0073431 | A1 | 5/2008 | Davis |
| 2014/0266669 | A1* | 9/2014 | Fadell .................. H05B 47/115 340/501 |
| 2015/0066227 | A1 | 3/2015 | Chapel et al. |
| 2015/0070190 | A1 | 3/2015 | Wai Fong et al. |
| 2015/0097949 | A1 | 4/2015 | Ure et al. |
| 2015/0097961 | A1 | 4/2015 | Ure et al. |
| 2015/0194040 | A1 | 7/2015 | Fiedler et al. |
| 2016/0125714 | A1 | 5/2016 | Kates et al. |
| 2016/0209899 | A1 | 7/2016 | Brantner et al. |
| 2016/0224043 | A1 | 8/2016 | Liu et al. |
| 2016/0323118 | A1 | 11/2016 | DiPoala |
| 2017/0067201 | A1 | 3/2017 | Jeon et al. |
| 2017/0272697 | A1* | 9/2017 | Moses ................... G05B 15/02 |
| 2017/0308109 | A1 | 10/2017 | Chapel et al. |
| 2017/0365143 | A1 | 12/2017 | King et al. |
| 2018/0048750 | A1 | 2/2018 | Hardi |

(56) References Cited

U.S. PATENT DOCUMENTS

| | | |
|---|---|---|
| 2018/0062674 A1 | 3/2018 | Boghrat et al. |
| 2018/0158312 A1* | 6/2018 | Tannenbaum ........... G07C 9/27 |
| 2018/0198984 A1 | 7/2018 | Palma et al. |
| 2018/0322751 A1 | 11/2018 | Sacre et al. |
| 2018/0323645 A1 | 11/2018 | Wilberforce |
| 2018/0343402 A1 | 11/2018 | Roth et al. |
| 2018/0343403 A1 | 11/2018 | Mehdi et al. |
| 2018/0364689 A1 | 12/2018 | O'Brien |
| 2019/0004486 A1 | 1/2019 | Hall et al. |
| 2019/0006064 A1 | 1/2019 | Hall et al. |
| 2019/0006833 A1 | 1/2019 | Hall et al. |
| 2019/0027875 A1 | 1/2019 | Parks |
| 2019/0027963 A1 | 1/2019 | Parks |
| 2019/0088096 A1 | 3/2019 | King et al. |
| 2019/0149969 A1 | 5/2019 | Tetreault et al. |
| 2019/0162705 A1 | 5/2019 | Langenberg et al. |
| 2019/0174099 A1 | 6/2019 | Hodge et al. |
| 2019/0180163 A1 | 6/2019 | Awheda et al. |
| 2019/0181690 A1 | 6/2019 | Haartsen et al. |
| 2019/0197858 A1 | 6/2019 | Moses |
| 2019/0199907 A1 | 6/2019 | Daulton |
| 2019/0226915 A1 | 7/2019 | Zhang et al. |
| 2019/0259260 A1 | 8/2019 | Amini et al. |
| 2019/0312396 A1 | 10/2019 | Kohen |
| 2019/0313227 A1 | 10/2019 | Berlin et al. |
| 2019/0378399 A1* | 12/2019 | Hoofe, IV ............. G08B 19/00 |

OTHER PUBLICATIONS

MyCleverHouse.com, Smart Home Devices That Complement Every House, 6 Reasons Why Liberty Safelert is Inferior to Nest Cam for Gun Safe, Jan. 5, 2017, 12 pages.

Brilliant Introduces Smart Home Control for Everyone, edn.com/brilliant-introduces-smart-home-control-for-everyone/, Feb. 8, 2017, 4 pages.

Brilliant Smart Home Control Demo (on YouTube) dated Feb. 26, 2017, 1 page.

Broussard, Mitchel, 'Brilliant Control' Lauches to Replace Regular Light Switches With Smart Home Controls, HomeKit Coming Later, Sep. 6, 2018, 8 pages.

Rossignol, Joe, 'Brilliant' Aims to Replace Your Home's Light Switches With Touchscreens, Feb. 8, 2017, 7 pages.

* cited by examiner

| IF | | THEN | |
|---|---|---|---|
| From Device | Communication | To Device | Transmit Instructions |
| host-carried monitor | motion sensed | server | store record of sensed motion in log |
| | | host-carried monitor | signal alarm |
| | | camera | signal alarm |
| | | switch | signal alarm |
| | | camera | capture image data |
| | | switch | capture image data |
| | | switch | turn electrical power ON |
| | | plug | turn electrical power ON |
| | | server | transmit alarm notification to communications terminal |
| host-carried monitor | door opened | server | store record of door opend in log |
| | | host-carried monitor | signal alarm |
| | | camera | signal alarm |
| | | switch | signal alarm |
| | | camera | capture image data |
| | | switch | capture image data |
| | | switch | turn electrical power ON |
| | | plug | turn electrical power ON |
| | | server | transmit door opened notification to comm. terminal |
| host-carried monitor | door closed | server | store record of door closed in log |
| | | server | transmit door closure notification to comm. terminal |
| host-carried monitor | humidity exception | server | store record of humidity exception in log |
| | | host-carried monitor | signal alarm |
| | | switch | trun electrical power ON |
| | | plug | trun electrical power ON |
| | | server | transmit humidity exception notification to comm. terminal |
| host-carried monitor | temperature exception | server | store record of temperature exception in log |
| | | host-carried monitor | signal alarm |
| | | switch | trun electrical power ON |
| | | plug | trun electrical power ON |
| | | server | transmit temp. exception notification to comm. terminal |
| host-carried monitor | power exception | server | store record of power exception in log |
| | | server | transmit power exception notification to comm. terminal |
| host-carried monitor | settings input via UI | server | store record of setting input in log |
| | | server | update settings data database |
| | | server | sync settings data to host-carried monitor |

FIG. 31A

| IF | | THEN | |
|---|---|---|---|
| From Device | Communication | To Device | Transmit Instructions |
| camera | motion sensed | server | store record of sensed motion in log |
| | | host-carried monitor | signal alarm |
| | | camera | signal alarm |
| | | switch | signal alarm |
| | | camera | capture image data |
| | | switch | capture image data |
| | | switch | turn electrical power ON |
| | | plug | turn electrical power ON |
| | | server | transmit motion sensed notification to comm. terminal |
| camera | LAN exception | server | store record of LAN exception in log |
| | | server | transmit LAN exception notification to comm. terminal |
| camera | power exception | server | store record of power exception in log |
| | | server | transmit power exception notification to comm. terminal |
| camera | settings input via UI | server | store record of setting input in log |
| | | server | update settings data in database |
| | | server | sync settings data to camera |
| switch | motion sensed | server | store record of sensed motion in log |
| | | host-carried monitor | signal alarm |
| | | camera | signal alarm |
| | | switch | signal alarm |
| | | camera | capture image data |
| | | switch | capture image data |
| | | switch | trun electrical power ON |
| | | plug | trun electrical power ON |
| | | server | transmit motion sensed notification to comm. terminal |
| switch | LAN exception | server | store record of LAN exception in log |
| | | server | transmit LAN exception notification to comm. terminal |
| switch | power exception | server | store record of power exception in log |
| | | server | transmit power exception notification to comm. terminal |
| switch | settings input via UI | server | store record of setting input in log |
| | | server | update settings data in database |
| | | server | sync settings data to switch |

FIG. 31B

SMART HOME AND SECURITY SYSTEM

CROSS-REFERENCE TO RELATED APPLICATIONS

The present application claims priority to U.S. Provisional patent application Serial No. 62/941,298, filed Nov. 27, 2019, and Ser. No. 63/060,277, filed Aug. 3, 2020, each of which is hereby incorporated by reference in its entirety.

FIELD

The present disclosure relates to security and smart home systems, components thereof, and associated methods.

BACKGROUND

Various types of security systems and smart home systems are known. Improvements are needed.

SUMMARY

In one aspect, a security system for a premises comprises a data communications network including a wireless local area network at the premises and a wide area network extending beyond the premises. The security system includes a host-carried security monitor carried by a host object at the premises for monitoring security data associated with the host object. The host-carried security monitor includes a plurality of security data sensors. The plurality of security data sensors include at least a motion sensor, a position sensor, and at least one of a temperature sensor or a humidity sensor. The motion sensor is configured to sense motion of the host-carried monitor and thus motion of the host object. The position sensor is configured to sense a position of the host-carried monitor relative to a reference. The host-carried security monitor includes a wireless communication port connecting the host-carried security monitor to the wireless local area network. The host-carried security monitor includes a security monitor controller and a security monitor storage medium. The security monitor storage medium stores instructions executable by the security monitor controller that, when executed by the security monitor controller, process security sensor data from at least one of the security data sensors to determine a security event and transmit a security event signal on the data communications network. The security system includes a security device at the premises and associated with the host-carried security monitor. The security device includes at least one of an image sensor configured to capture image data, a motion sensor configured to detect motion in a field of view of the motion sensor, or a switch configured to selectively close to provide electrical power to an electronic device operatively connected thereto. The security device includes a wireless communication port connecting the security device to the wireless local area network. The security device includes a security device controller and a security device tangible storage medium. The security system includes a server located remotely with respect to the premises and operatively connected to the wide area network. The server is in communication with the host-carried security monitor and the security device via the data communications network. The server includes a security system processor and a security system tangible storage medium. The security system tangible storage medium stores instructions executable by the security system processor that, when executed by the security system processor, determine an action instruction based on the security event signal received on the data communications network from the host-carried monitor and transmit said action instruction to the security device. The security device controller is responsive to the action instruction from the server to cause the security device to perform a security action.

In another aspect, a security system for a premises comprises a data communications network including a wireless local area network at the premises and a wide area network extending beyond the premises. A security data monitor at the premises monitors security data at the premises. The security data monitor includes at least one of a motion sensor, a position sensor, a temperature sensor, or a humidity sensor. The position sensor is configured to sense a position of the security data monitor relative to a reference. The security data monitor includes a wireless communication port connecting the security data monitor to the wireless local area network. The security data monitor includes a security data monitor controller and a security data monitor storage medium. The security data monitor storage medium stores instructions executable by the security data monitor controller that, when executed by the security data monitor controller, process sensor data from said at least one of the motion sensor, position sensor, temperature sensor, or humidity sensor, to determine a security event and transmit a security event signal on the data communications network. The security system includes a security device at the premises and associated with the security data monitor. The security device includes at least one of an image sensor configured to capture image data, a motion sensor configured to detect motion in a field of view of the motion sensor, or a switch configured to selectively close an electrical circuit to provide electrical power to an electronic device operatively connected thereto. The security device includes a wireless communication port connecting the security device to the wireless local area network. The security device includes a security device controller and a security device tangible storage medium. The security system includes a server located remotely with respect to the premises and operatively connected to the wide area network. The server being in communication with the host-carried security monitor and the security device via the data communications network. The server including a security system processor and a security system tangible storage medium. The security system tangible storage medium stores instructions executable by the security system processor that, when executed by the security system processor, determine an action instruction based on the security event signal received from the security data monitor via the data communications network, and transmit said action instruction to at least one of the security data monitor or security device. The tangible storage medium of said at least one of the security data monitor and security device stores instructions that, when executed by the respective security data monitor controller or security device controller, execute an action responsive to the action instruction from the server.

In yet another aspect, an electrical power switching control comprises a housing and electrical connectors supported by the housing. The electrical connectors are configured to connect the electrical power switch to a power grid. The electrical power switching control includes a switch configured to selectively close to close a circuit of the power grid to provide electrical power to an electrical device operatively connected thereto. The electrical power switching control includes an actuator supported by the housing and operatively connected to the switch. The switch is responsive to user input via the actuator to selectively close the switch to close the circuit. The electrical power switching control comprises a motion sensor supported by the housing. The motion sensor is configured to sense motion in a field of view of the motion sensor. A wireless communication port is supported by the housing. The wireless communication port is configured to connect to a wireless data communications network. The electrical power switching control includes an electrical power switching control controller and an electrical power switching control tangible storage medium. The electrical power switching tangible storage medium stores instructions executable by the electrical power switching controller that, when executed by the electrical power switch controller, process data from the motion sensor to determine a security event and transmit a security event signal on the data communications network.

Other objects and features of the present disclosure will be in part apparent and in part pointed out herein.

BRIEF DESCRIPTION OF THE DRAWINGS

FIGS. 31A and 31B illustrate an example database of settings referenced by the remote server in the process of FIG. 29.

Corresponding reference characters indicate corresponding parts throughout the drawings.

DETAILED DESCRIPTION

Figure 1:
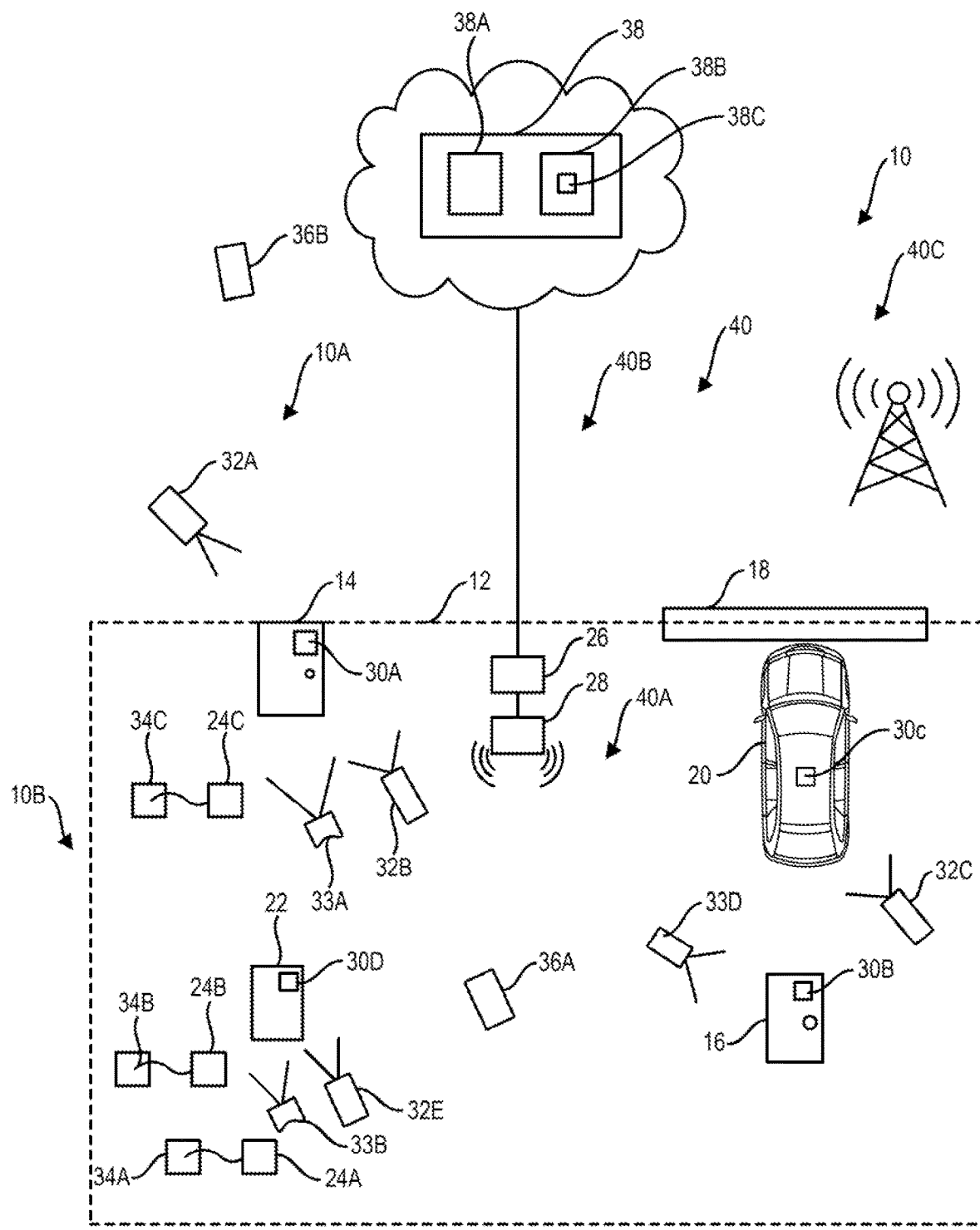
FIG. 1 is a schematic of a smart home and security monitoring system of the present disclosure.

Referring to the drawings, FIG. 1 illustrates one embodiment of a smart home and security monitoring system, designated by the reference number 10. As will become apparent, the system 10 can be used to monitor security of a premises, including an area of land and a building (e.g., home, business, etc.), vehicle, enclosure (e.g., vault, cabinet, drawer, etc.), boat, trailer, mobile home, and/or other objects (e.g., firearm, computer, valuable, heirloom) on the area of land. Components of the system 10 may be used as standalone components or with any combination of other components to form a broader system. For example, smart home components could be used without security monitoring components, and vice versa.

The smart home and security monitoring system 10 is shown schematically in FIG. 1 as implemented for a home 12, but it will be appreciated that the system or components thereof could be implemented in other scenarios (e.g., other buildings, structures, or other interior or exterior areas) without departing from the scope of the present disclosure. A perimeter of the home 12 is indicated by a broken line. The home 12 includes an exterior door 14 (e.g., front door), an interior door 16 (e.g., bedroom door), and a garage door 18. A vehicle 20 (e.g., automobile) is parked in a garage of the home 12 behind the garage door 18. The home 12 also includes another object shown schematically and indicated by 22. The object 22 could be a firearm, an heirloom, a container (e.g., cabinet, chest of drawers, night stand, dresser, storage bin), a vault (e.g., lock box, gun safe, safe room), and/or a door, drawer, or other closure (e.g., door, firearm lock) of such an object, or another type of object. The home 12 further includes a plurality of electrical devices (e.g., electrical appliances), such as lights 24A, a dehumidifier 24B, a coffee maker 24C, etc., which will be described in further detail below. Finally, the home 12 includes a modem 26 providing Internet service to the home and a wireless router 28 establishing a wireless local network (e.g., Wi-Fi) having a range desirably at least covering the building and extending beyond the building sufficiently to cover the premises.

The system includes smart security monitoring apparatus 10A and smart home apparatus 10B. The security monitoring apparatus 10A includes a plurality of security monitors 30A-30D, 32A-32E, 33A-33B (e.g., detectors, data collectors, etc.) configured to monitor various security parameters. As will become apparent, each of the monitors 30A-30D, 32A-32E, 33A-33B has one or more sensors configured to collect data for use in monitoring security, and at least one port for communicatively coupling the monitor to a network. The smart home apparatus 10B includes a plurality of smart home components 34A-34C configured to facilitate use of the home 12 and objects therein. The smart home apparatus 10B can be used in cooperation or coordination with the security monitoring apparatus 10A. In some embodiments, smart home apparatus 10B can double as security monitoring apparatus (security devices), and vice versa. The security monitoring apparatus 10A and smart home apparatus 10B may be referred to as devices (e.g., smart devices). As will be explained in further detail below, the system 10 also includes at least one smart communication terminal 36A, 36B (e.g., smart phone, tablet, and/or computer) configured to permit the user to interact with the security monitoring apparatus 10A and the smart home apparatus 10B.

The system 10 includes a data communication network 40 communicatively coupling the smart home apparatus 10B, the security monitoring apparatus 10A, the communication terminals 36A, 36B, and at least one remote computer 38 (broadly, "the cloud" or "remote server"). In the illustrated embodiment, the network 40 includes a local area network 40A (LAN) in the form of the wireless Wi-Fi network hosted by the router 28. The network 40 also includes a wide area network 40B (WAN) in the form of the Internet connected to the LAN 40A via the modem 26. It will be appreciated that communication terminals (e.g., 36A) located in the range of the LAN 40A (e.g., inside the building 12 or outside but proximate to the building) could be communicatively coupled to the smart home apparatus 10B and security monitoring apparatus 10A via the LAN 40A. Communication terminals (e.g., 36B) out of range of the LAN 40A can be communicatively coupled to the components on the LAN via the Internet 40B and the LAN. The data communications network 40 can also include a cellular network 40C (WAN) including one or more cellular towers for communicatively coupling components of the system 10. If a LAN or the Internet is not available at a site where the smart home apparatus 10B, security monitoring apparatus 10A, and/or smart communication terminal 36A, 36B is/are located, the cellular network 40C can be used to communicatively couple to the data communications network 40 and thus to the other components on the network. For example, if a system is to be deployed in a rural location, the Internet may not be available, but a cellular network 40C could be used for communicatively coupling one or more smart home and/or security monitoring apparatus 10B, 10A to one or more communication terminals and/or a remote server, as explained below. Referring to FIG. 1, in one embodiment, the router 28 (or a device connected thereto) is configured to communicate on the cellular network 40C (WAN) such that the router hosting the LAN 40A can communicate via the cellular network in the absence of Internet connectivity. In such an embodiment, the router 28 and/or other device could act as a centralized cellular communications hub rather than having a plurality of system components separately communicating on the cellular network 40C.

Figure 28:
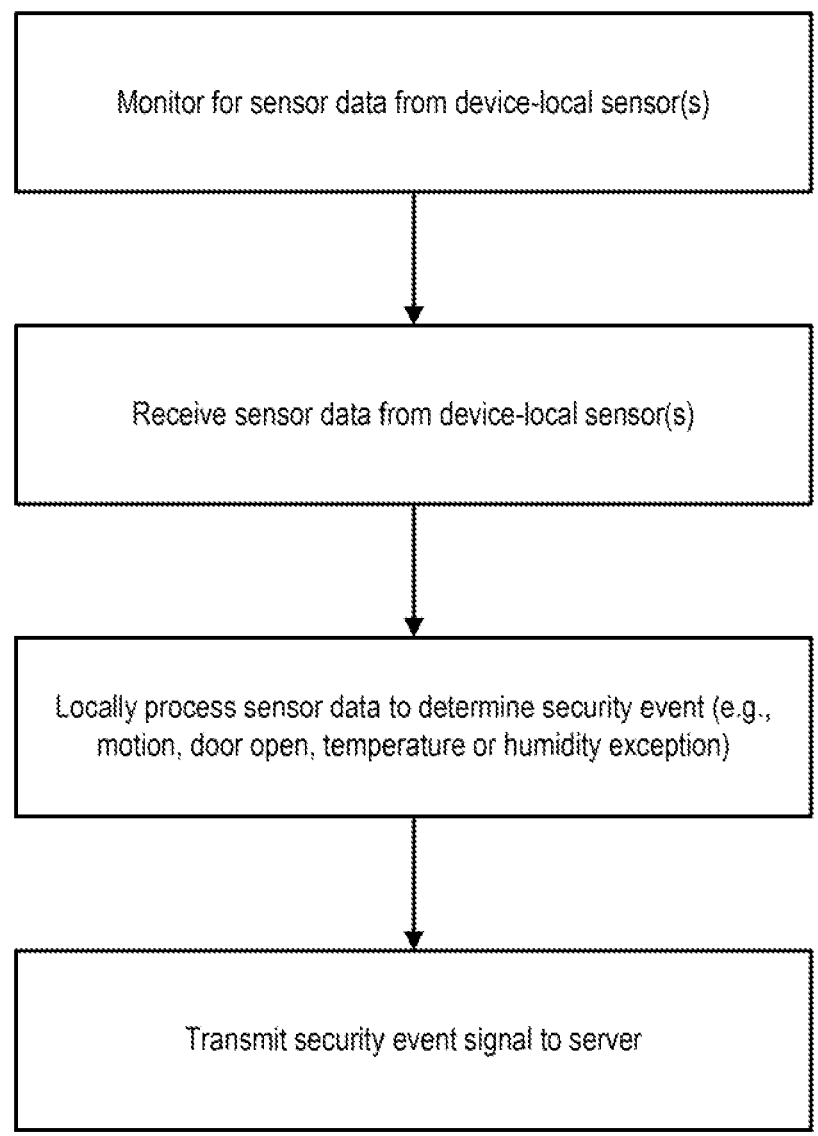
FIG. 28 is a flow diagram showing an example process of a smart device receiving and processing sensor data to determine a security event and then transmitting a security event signal to a remote server.
Figure 29:
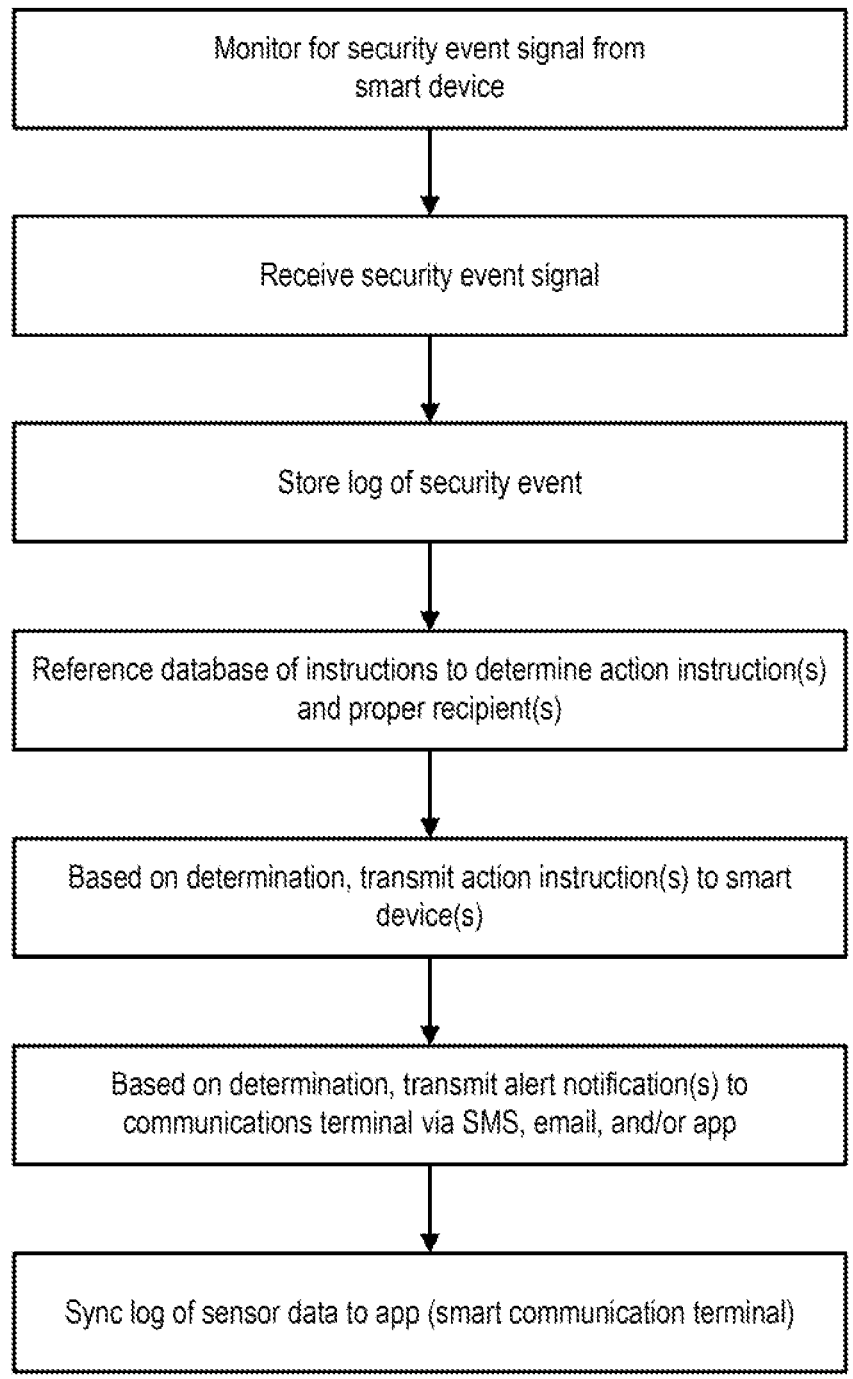
FIG. 29 is a flow diagram showing an example process of the remote server receiving and processing a security event signal and transmitting action instructions responsive thereto.
Figure 30:
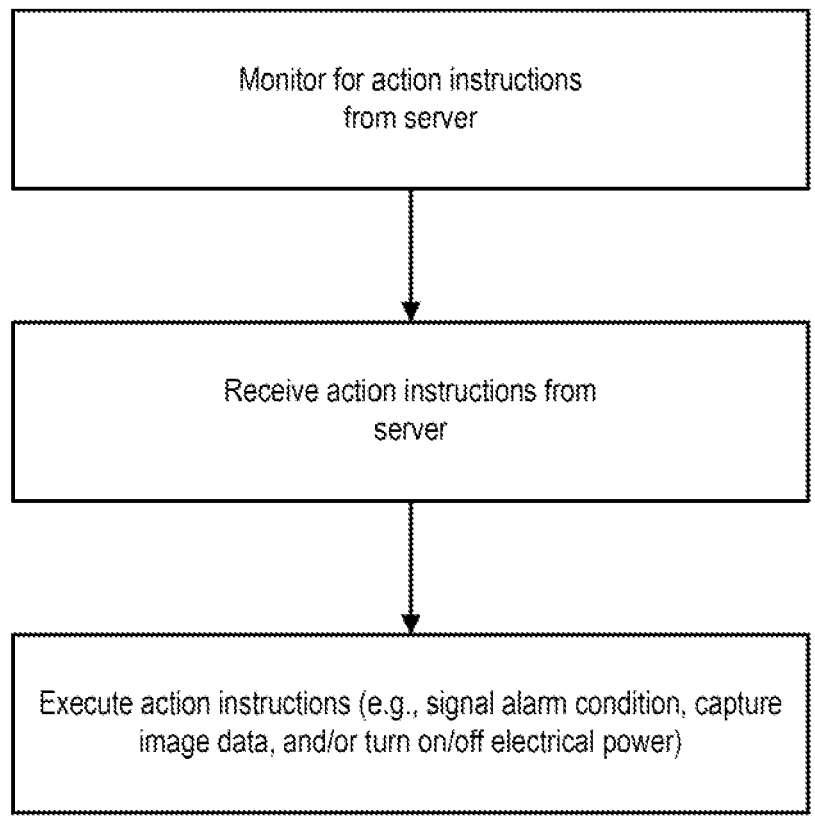
FIG. 30 is a flow diagram showing an example process of a smart device receiving action instructions form the server and executing same.

As will become apparent, the smart devices perform some actions locally or onboard the devices. For example, see the process outlined in FIG. 28. In one example, a smart device with a motion sensor can execute with an onboard controller instructions to evaluate whether motion sensor data rises to the level of or indicates a security event (e.g., tilting, jarring). In another example, a smart device with an image sensor can execute with an onboard controller instructions to monitor for pixel changes within a preset area of a field of view of the image sensor to detect motion and evaluate whether the motion rises to the level of or constitutes a security event. However, the smart devices desirably do not directly interact with each other. Instead, as indicated in FIG. 28, the smart devices transmit security signals (e.g., security event signals representing security sensor data) to the remote server 38, which, as indicated in FIG. 29, processes the signals, determines appropriate action instructions and recipient smart devices (based on a database of preset action instructions, such as shown in FIGS. 31A, 31B), and transmits the action instructions to one or more smart devices on the premises. For example, the server 38 may instruct one or more of the smart devices to signal an alarm, to collect image data, and/or to close a switch (e.g., to provide electrical power to a light or other electrical device). It will be appreciated that the remote server 38 serves as the "brains" for controlling interaction of the smart devices. This enables the electronics onboard the smart devices to be less complex or robust and therefore less expensive. Moreover, it will be appreciated that a local hub is not required on the premises to act as a centralized or master control for the smart devices. Accordingly, the user need not purchase and maintain a local hub, which serves as a bottleneck for failure if the hub malfunctions or stops working. However, such a hub could be provided without departing from the scope of the present disclosure.

In the illustrated embodiment, the monitors include a plurality of host-carried security monitors 30A-30D, a plurality of cameras 32A-32E, and a plurality of electrical power switches 33A, 33B (e.g., for turning on/off lights or selectively energizing electrical wall outlets). The host-carried security monitors 30A-30D are configured to monitor security data associated with a host which carries the monitor. For example, the monitor 30A-30D could be attached (e.g., mounted, secured, fastened) to the host, in which case the monitor could be referred to as a host-attached monitor. In some instances, a host-attached monitor 30A-30D could be used as a retrofit security solution on a host not originally constructed to include such a monitor. In some embodiments, the monitor 30A-30D could be formed as part of or integrated with the host. A host could be any object for which a user would like to monitor security. In the illustrated embodiment, a first host-carried security monitor 30A is carried by the exterior door 14, a second host-carried security monitor 30B is carried by the interior door 16, and a third host-carried security monitor 30C is carried by the vehicle 20. The first, second, and third host-carried monitors 30A-30C could be formed separately from their hosts and attached thereto such that the monitors are host-attached monitors. A fourth host-carried monitor 30D is carried by the object 22. As explained above, the object 22 could be a valuable, a container, a closure (e.g., door), etc. The fourth host-carried monitor 30D could be integrated with the object 22 as original equipment or be formed separately and attached to the object as a retrofit security solution. Hereafter, the object 22 will be referred to as a door of a vault (e.g., gun vault) and described in that context. The vault could be a room of the house or a stand-alone cabinet-type vault.

Figure 2:
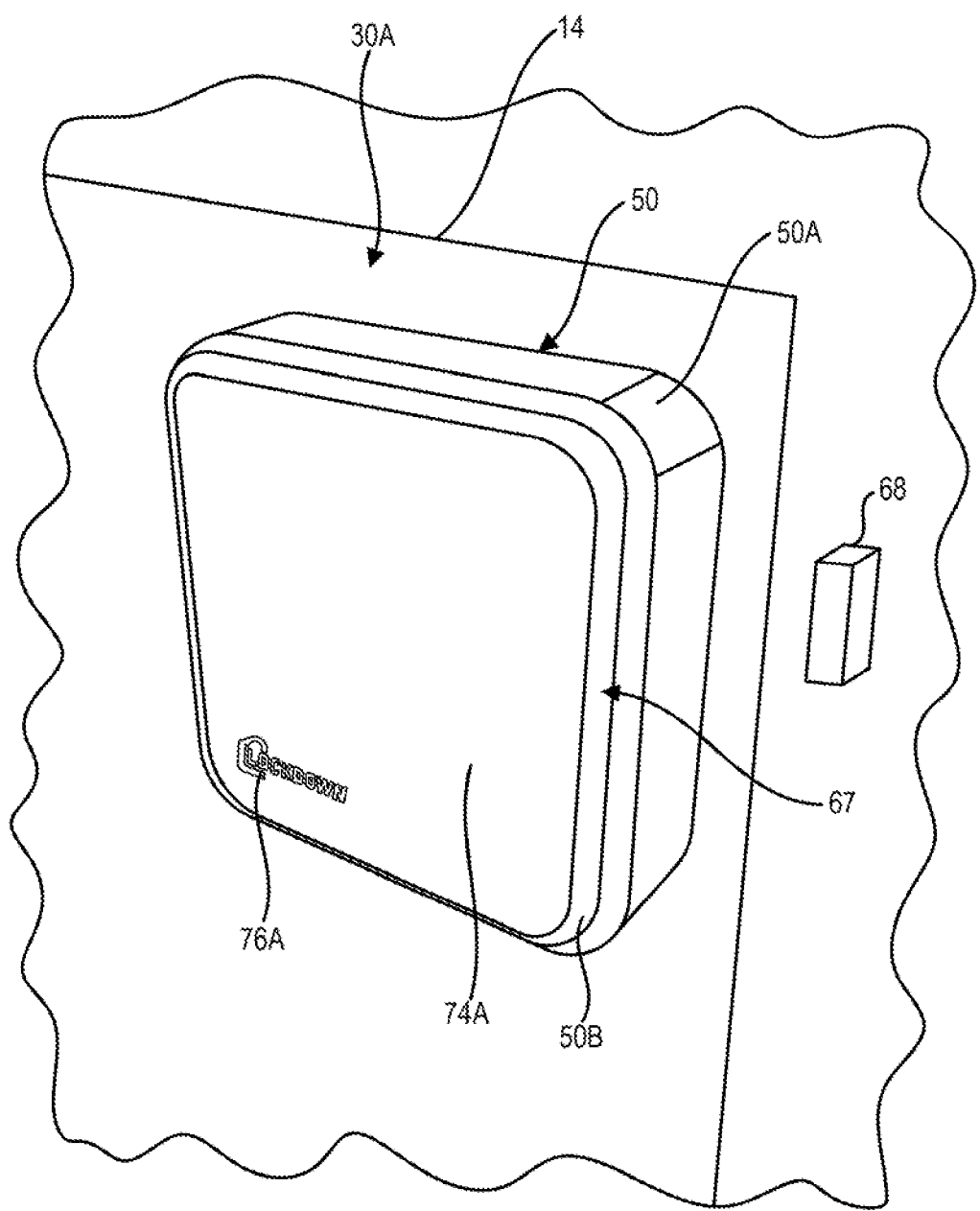
FIG. 2 is a perspective of a host-carried monitor of the system installed on a door.
Figure 3:
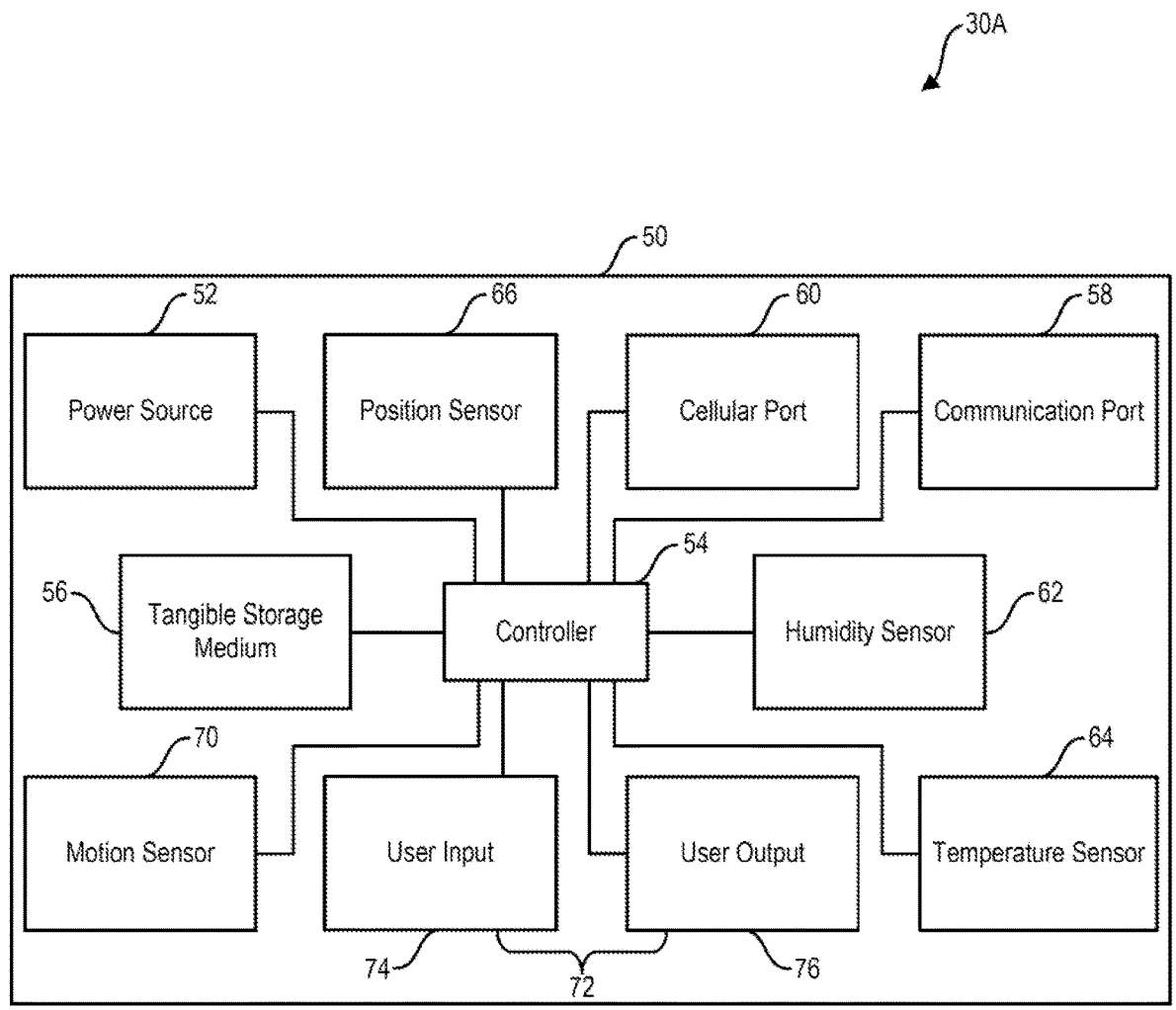
FIG. 3 is a schematic the host-carried monitor.
Figure 12:
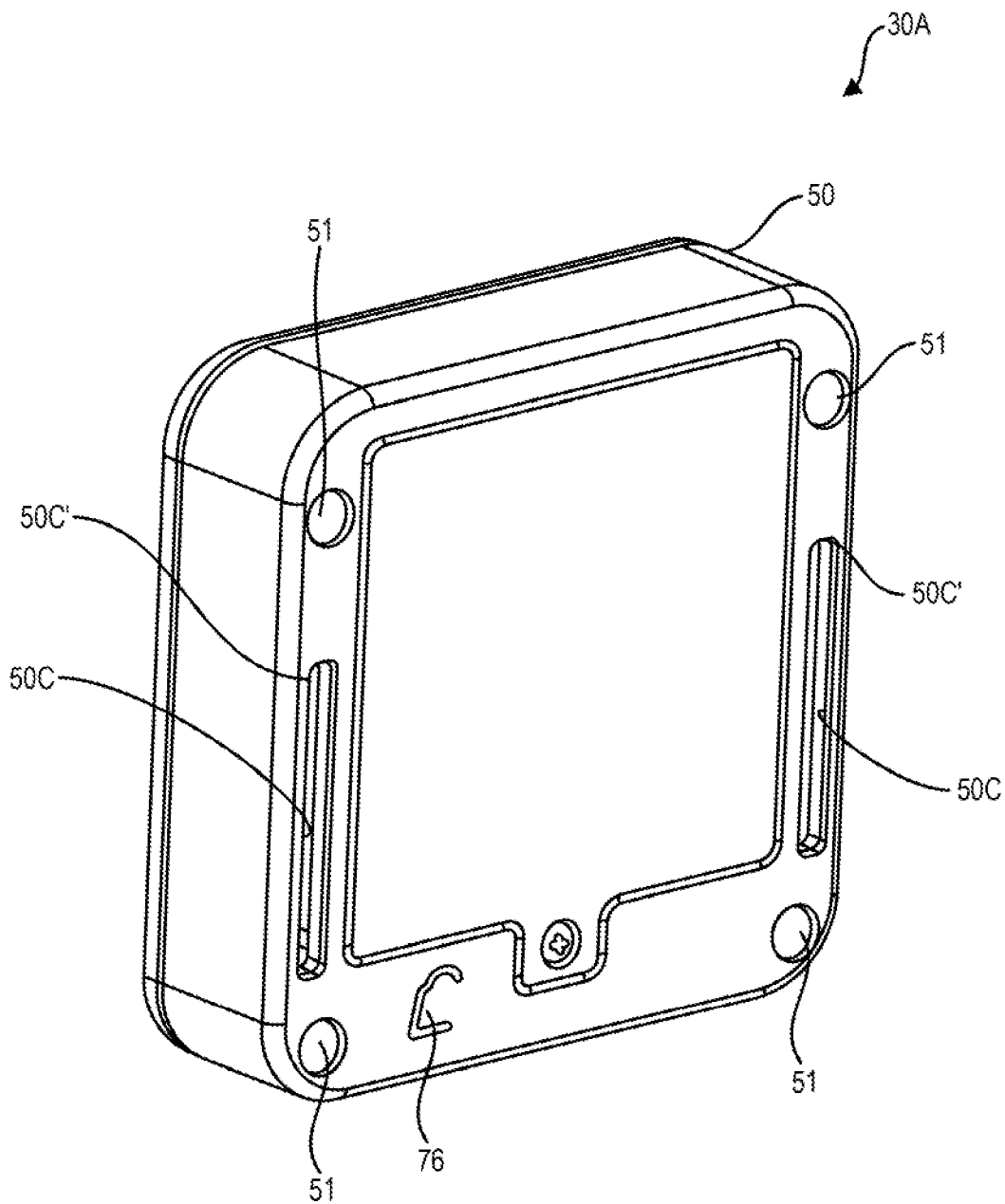
FIG. 12 is a rear perspective of the monitor.
Figure 13:
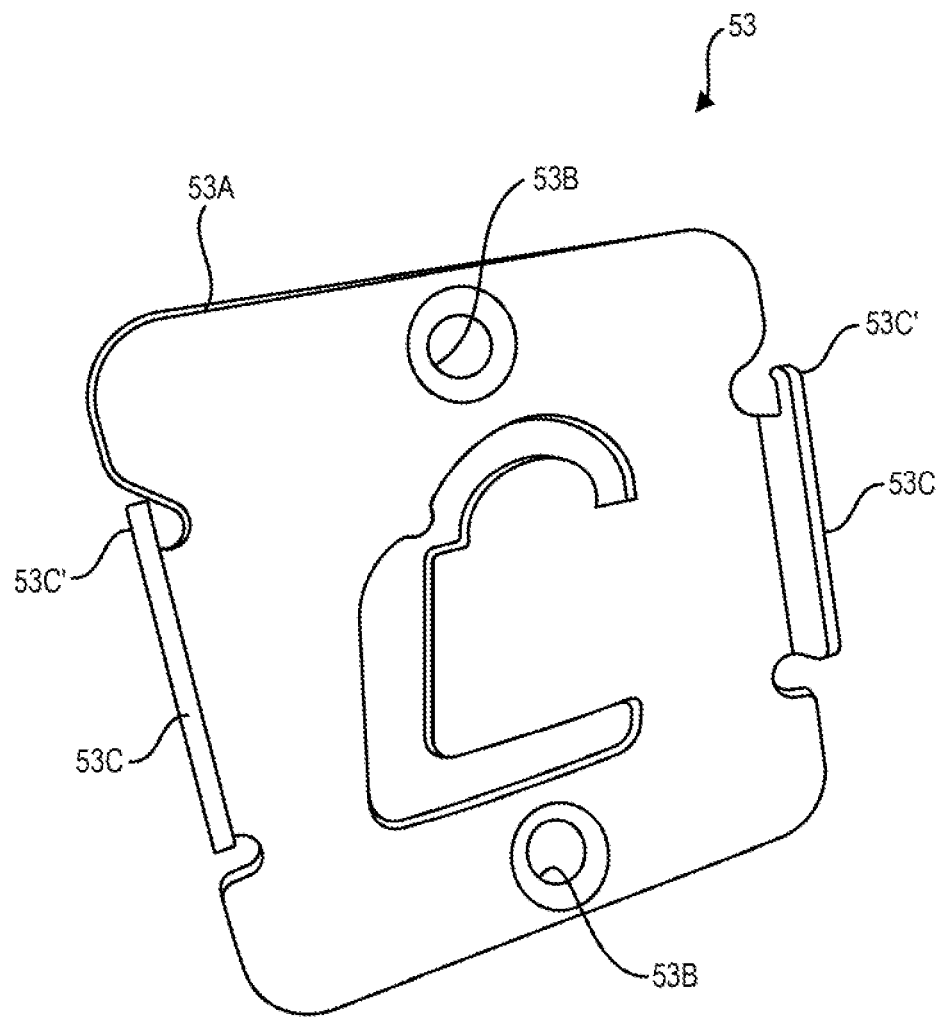
FIG. 13 is a front view of the monitor and a mounting bracket for the monitor.
Figure 14:
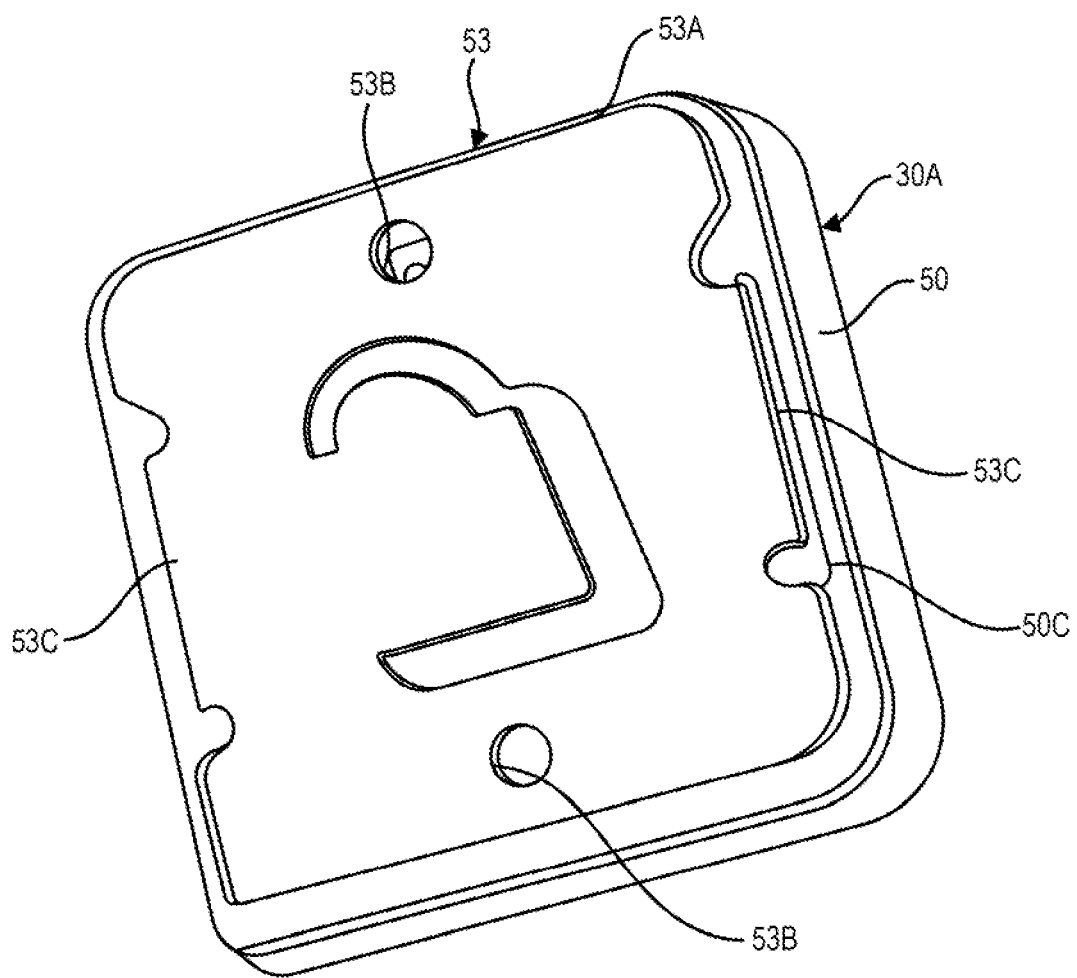
FIG. 14 is a rear perspective of the mounting bracket on the monitor.

An example embodiment of a host-carried monitor 30A is shown in FIGS. 2, 3, and 11-14. It will be understood that the other host-carried monitors 30B-30D could have an identical construction. In FIG. 2, the monitor 30A is shown as installed on the door 14 proximate to a door frame. The door is shown in a closed position relative to the door frame. The monitor 30A may be referred to as a "puck" and has a relatively small housing 50 (e.g., 3 inches wide, 3 inches tall, and 1 inch thick). The housing 50 supports and houses a variety of electrical components for monitoring the host which carries the monitor. The housing 50 includes a peripheral wall 50A and a front portion or face 50B. The monitor 30A can be installed in various ways. For example, magnets 51 (FIG. 12) could be provided on the housing 50 for connecting the monitor to ferromagnetic material such as metal. The monitor 30A could also be connected in other ways, such as via adhesive, hook-and-loop fabric, etc. As shown in FIGS. 12-14, a mounting bracket 53 may be used for mounting the monitor 30A. The mounting bracket 53 has a main body 53A including fastener openings 53B for use in fastening the bracket to a host (e.g., door). The mounting bracket 53 includes two hangers 53C (broadly, "arms") protruding from the main body for holding the monitor. The rear of the monitor 30A includes slots 50C (FIG. 12) in which the hangers 53C are receivable for mounting the monitor on the bracket 53. The upper ends of the hangers 53 define hooks 53C' to prevent the monitor from inadvertently falling off the hangers. The arrangement is such that after the bracket 53 is mounted to a host, the monitor 30A can be connected to the bracket via the hangers 53. The monitor 30A is positioned adjacent the bracket 53 with the slots 50C in registration with the hangers 53. The monitor 30A is then moved toward the bracket 53 to locate the hangers 53 in the slots. Then the monitor 30A is moved laterally (e.g., downward) to bring the hooks 53C' into retaining relationship with keepers 50C' at ends of the slots 50C. In the retaining relationship, the hooks 53C' limit movement of the monitor 30A away from the main body 53A. The magnets in the housing of the monitor can assist in securing the monitor to the metal bracket if it is ferromagnetic. Other ways of mounting the monitor can be used without departing from the scope of the present disclosure.

The monitor 30A includes a power source 52, such as a battery (e.g., plurality of batteries) and/or electrical power port (e.g., micro USB port) configured to receive a power cable. The power port can be used as a primary power source, and the battery could be used as a backup power source. Alternatively, the battery may be used as a sole power source.

Figure 16:
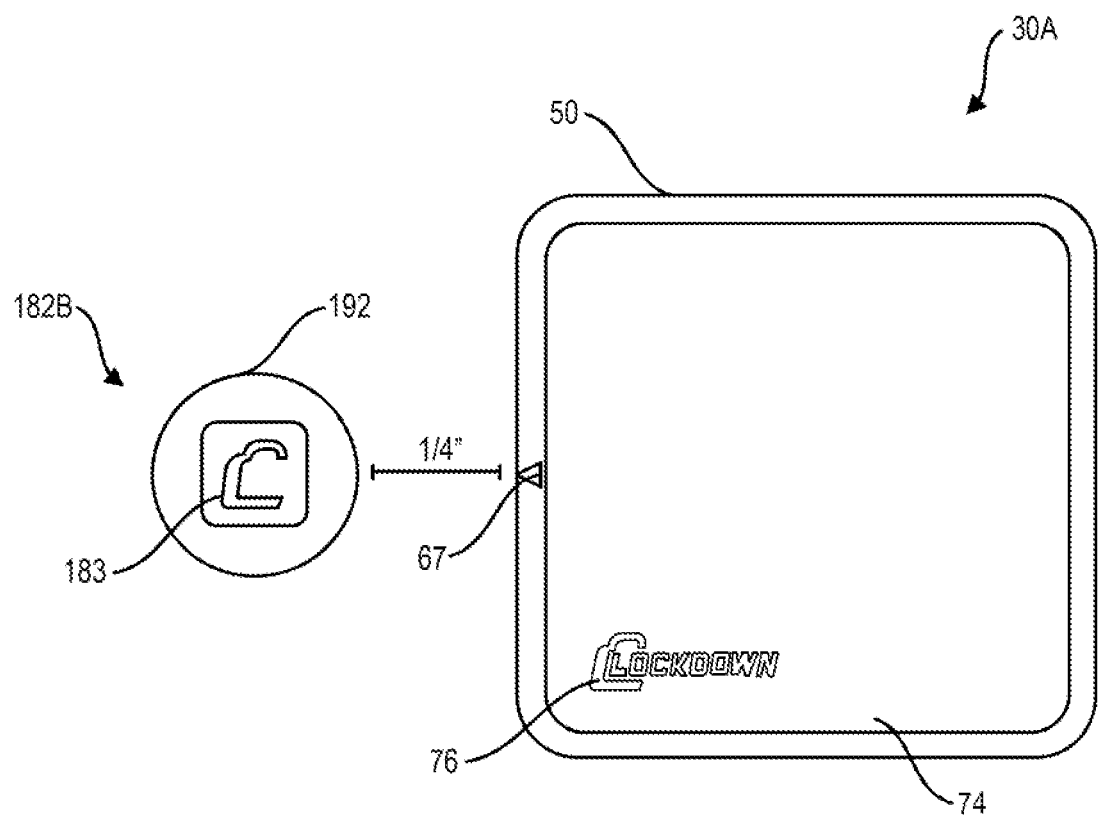
FIG. 16 is a front view of the monitor alongside the magnet.

The monitor 30A includes a host-carried monitor controller 54 (e.g., microprocessor or processor) and a tangible storage medium 56 storing processor-executable instructions for execution by the controller 54. The controller 54 and tangible storage medium 56 (as with other controllers and tangible storage mediums described herein) could be embodied as single board computer including a circuit board, microprocessor(s), memory, input/output, and other devices, or other suitable constructions. For example, the tangible storage medium 56 can store instructions to connect the monitor 30A to the data communications network 40 when network availability is detected. The monitor 30A includes at least one communications port 58 configured to communicatively couple the monitor to the data communications network 40. For example, the port 58 could comprise a Wi-Fi transceiver for transmitting and receiving wireless data signals on the Wi-Fi network. The communications port 58 could comprise other types of wireless ports (e.g., Bluetooth, ZigBee, NFC, etc.) or wired ports (e.g., Ethernet, serial, etc.). Optionally, a cellular port 60 (transceiver) is also provided for communicatively coupling the monitor 30A to the cellular network 40C. The monitor 30A further includes a humidity sensor 62 and temperature sensor 64 (broadly, "environmental sensors") for sensing environmental temperature and humidity conditions proximate the host. The monitor 30A includes a position sensor 66 for sensing a position of the monitor 30A and thus the position of the host carrying the monitor. For example, the position sensor 66 could be a Hall effect sensor, configured to sense a location of the sensor with respect to a magnet or reference 68 (FIG. 2) mounted on the door frame or other structure near the door 14. The position sensor 66 enables the monitor 30A to sense whether the door 14 is open or closed (broadly, "position security event"). As shown in FIG. 16, the monitor can include an indicator 67 indicating to the user the location of the position sensor 30A. For example, an arrow 67 (e.g., arrow formed in housing 50) or other indicia can be provided on the housing to inform the user in orienting the monitor so the position sensor can properly sense the magnet 68. Other types of position sensors could be used. The monitor 30A includes a motion sensor 70 configured to sense motion of the monitor and thus motion of the host (e.g., door 14) carrying the monitor. For example, the motion sensor 70 could comprise an accelerometer configured to detect vibration or other types of movement (e.g., acceleration) of the monitor. Such an accelerometer could indicate motion such as tilting, jarring, etc. The controller 54 could execute instructions stored on the tangible storage medium 56 to analyze or evaluate sensor data from the accelerometer to determine whether the sensed motion rises to the level of a reportable motion security event and what type of motion event it was (e.g., jarring, tilting, impact). For example, if the motion exceeds a threshold amount, level, or type of motion and persists for a preset duration (based on selectable sensitivity settings of high, mid, low, and off), the controller 54 will determine a security event has occurred and transmit a corresponding signal to the server 38.

The monitor 30A includes a user interface 72 comprising a user input 74 and a user output 76. In the illustrated embodiment, the user input 74 comprises a button 74A (broadly, "actuator") on the front of the monitor 30A. In the illustrated embodiment, the button forms substantially all of the front face of the monitor. For example, the button 74A could be used to "arm" or "disarm" the monitor 30A to selectively put the monitor in an active state of monitoring. The user output 76 includes an indicator 76A such as an LED (e.g., illuminated Lockdown logo) to indicate status information to the user. For example, the indicator 76A could indicate whether the monitor 30A is armed or disarmed (e.g., red or green, respectively), and/or the indicator could indicate charge level of the battery, network connection status, etc. The user output 76 could also include an audio or visual alarm (e.g., speaker or light) configured to indicate an alarm state based on sensed data, such as motion, change of position, etc. For example, a speaker could "chirp" whenever the host door is opened and/or closed, and the speaker could emit an alarm sound when the monitor is armed and preset alarm conditions are detected (e.g., motion, door open, temperature or humidity out of range, etc.).

The cameras 32A-32E can be located anywhere a user would like to monitor (e.g., interior or exterior location). In the embodiment illustrated in FIG. 1, the cameras 32A-32E are spaced around the home 12 to monitor various areas of the home, interior and exterior. Other numbers (e.g., one, two, three, or more) and arrangements of cameras can be used without departing from the scope of the present disclosure. Each camera 32A-32E has a field of view generally in the shape of a cone extending away from the camera. In the illustrated embodiment, the cameras 32A-32E are located to monitor objects also monitored by associated host-carried monitors 30A-30D. For example, a first camera 32A is located exterior of the home to monitor the exterior door 14, and a second camera 32B is located in the home interior to monitor the same exterior door. A third camera 32C is located in the garage to monitor the vehicle 20 and other objects in the garage. A fourth camera 32D is located to monitor the interior door 16. A fifth camera 32E is located to monitor the vault door 22. In the illustrated embodiment, the field of view of each camera 32A-32E includes the respective host carrying the host-carried monitor 30A-30D associated with the camera. Other arrangements can be used without departing from the scope of the present disclosure. For example, one or more cameras could be used without an associated host-carried monitor, or vice versa.

Figure 4:
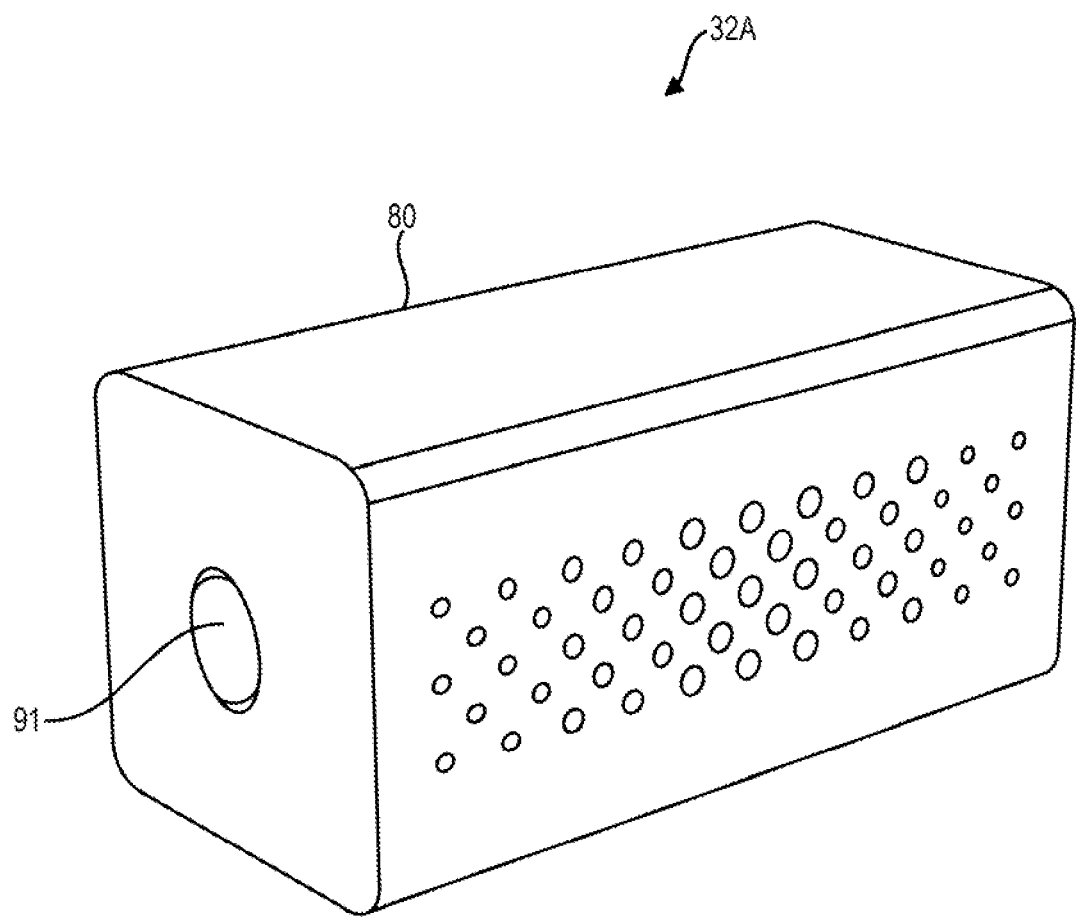
FIG. 4 is a perspective of a camera of the system.
Figure 5:
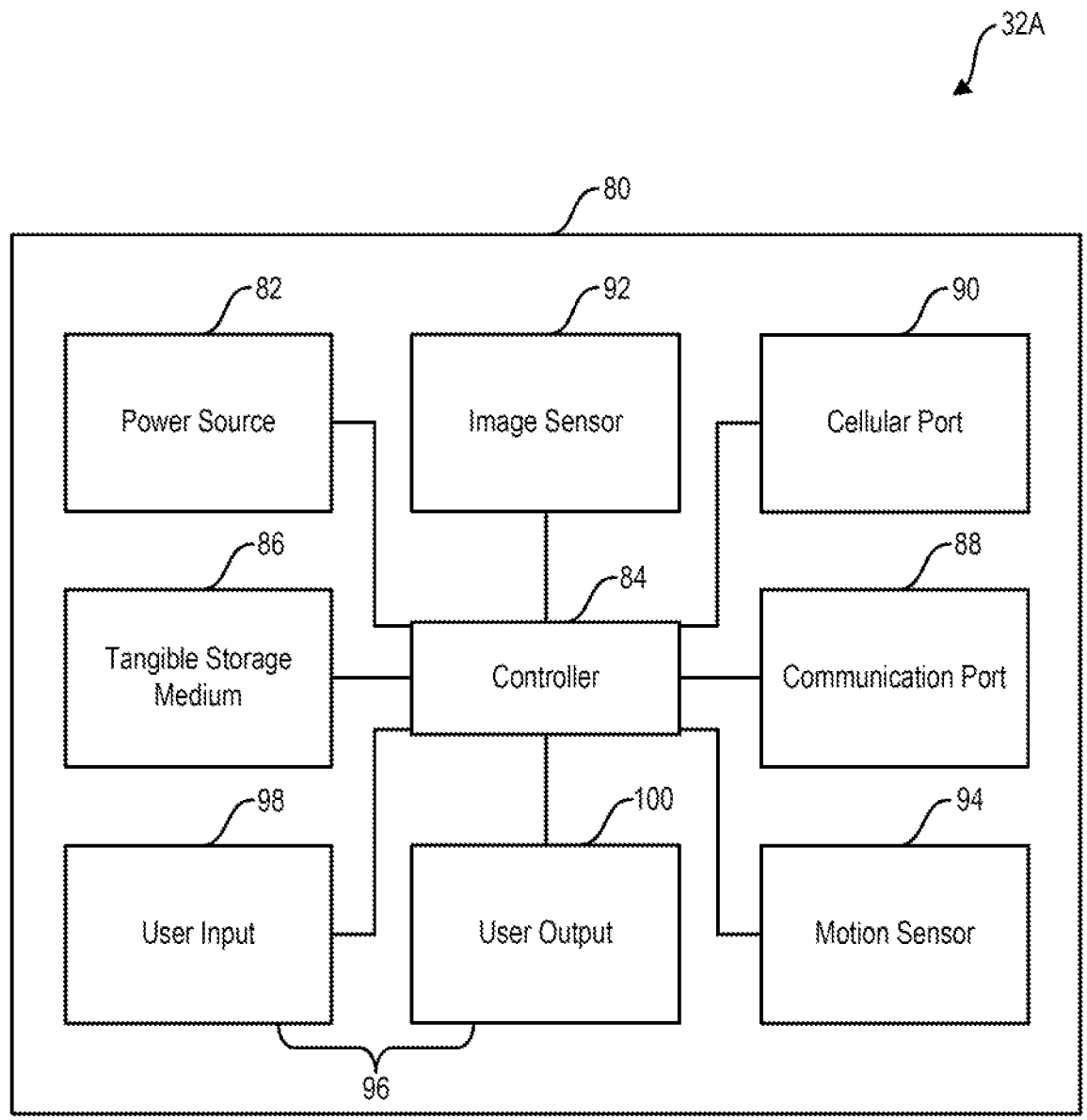
FIG. 5 is a schematic of the camera.

An example embodiment of a camera 32A is shown in FIGS. 4 and 5. It will be appreciated the cameras 32B-32E could have an identical construction. The camera 32A includes a housing 80 that supports and houses a variety of electrical components. The camera 32A could be installed in various ways, such as fasteners, brackets, magnets, adhesive, hook-and-loop fabric, etc., without departing from the scope of the present disclosure. The camera 32A includes a power source 82, such as a battery and/or electrical power port (e.g., micro USB port) configured to receive a power cable. The power port can be used as a primary power source, and the battery could be used as a backup power source. Alternatively, the battery may be used as a sole power source. The camera 32A includes a camera controller 84 (e.g., microprocessor or processor) and a tangible storage medium 86 storing processor-executable instructions for execution by the camera controller. For example, the tangible storage medium 86 can store instructions to connect the camera 32A to the data communications network 40 when network availability is detected. The camera 32A includes at least one communications port 88 configured to communicatively couple the camera 32A to the data communications network 40. For example, the port 88 could comprise a Wi-Fi transceiver for transmitting and receiving wireless data signals on the Wi-Fi network. In other embodiments, the communications port 88 could comprise other types of wireless ports (e.g., Bluetooth, ZigBee, NFC, etc.) or wired ports (e.g., Ethernet, serial, etc.). Optionally, a cellular port 90 is also provided for communicatively coupling the camera to the cellular network 40C. Behind a lens 91, the camera 32A includes an image sensor 92 configured to collect image data (e.g., photographs and/or video). Image sensor data could be stored in the tangible storage medium 86 and/or in the cloud 38, but desirably in the cloud. The camera 32A includes a motion sensor 94 (e.g., passive infrared (PIR) sensor or microwave radar sensor) configured to detect movement in the field of view of the camera 32A. The controller 84 may execute instructions stored in the tangible storage medium 86 (and synced with the server 38) to determine whether motion sensor data rises to the level of constitutes a security event, in which case a corresponding security event signal would be sent by the controller to the server 38. Alternatively, or in addition, the image sensor 92 could be used as a motion sensor. For example, the controller 84 may execute instructions stored in the tangible storage medium 86 (and synced with the server 38) to monitor a preset area of the field of view for pixel change and to evaluate whether such change indicates or constitutes a security event, in which case a corresponding security event signal would be sent by the controller to the server 38. Moreover, the controller 84 may execute instructions stored on the tangible storage medium (and synced with the server 38) to monitor temperature sensor and humidity sensor data to detect when the sensed temperature or humidity is out of a preset range (exception) and transmit a corresponding signal to the server. The camera 32A includes a user interface 96 comprising a user input 98 and a user output 100. The user input 98 can comprise a button or other actuator operable to "arm" or "disarm" the camera 32A to selectively put the camera in an active state of monitoring. The user output 100 can include an indicator such as an LED to indicate status information to the user. For example, the indicator could indicate whether the camera 32A is armed or disarmed, and/or could indicate charge level of the battery 82 via green, yellow, or red colors corresponding to high, medium, and low charge levels. The user output 100 could also include an audio or visual alarm (e.g., speaker or light) configured to indicate an alarm state.

The electrical power switches 33A-33B (broadly, "electrical power switching control") can be located anywhere a conventional electrical power switch might be located, such as in a house or other building. The electrical power switches can have a configuration somewhat similar to a common electrical power switch and be connectable to an electrical power grid of the house, building, or other structure. For example, the electrical power switches may selectively supply electrical power to electrical devices, such as lights, fans, electrical power outlets, dehumidifiers, etc., in circuit with the electrical power switches on the electrical power grid of the structure. In the embodiment illustrated in FIG. 1, the switches 33A, 33B are spaced around the interior of the home 12. Other numbers (e.g., one, three, or more) and arrangements of electrical power switches can be used without departing from the scope of the present disclosure.

Figure 19A:
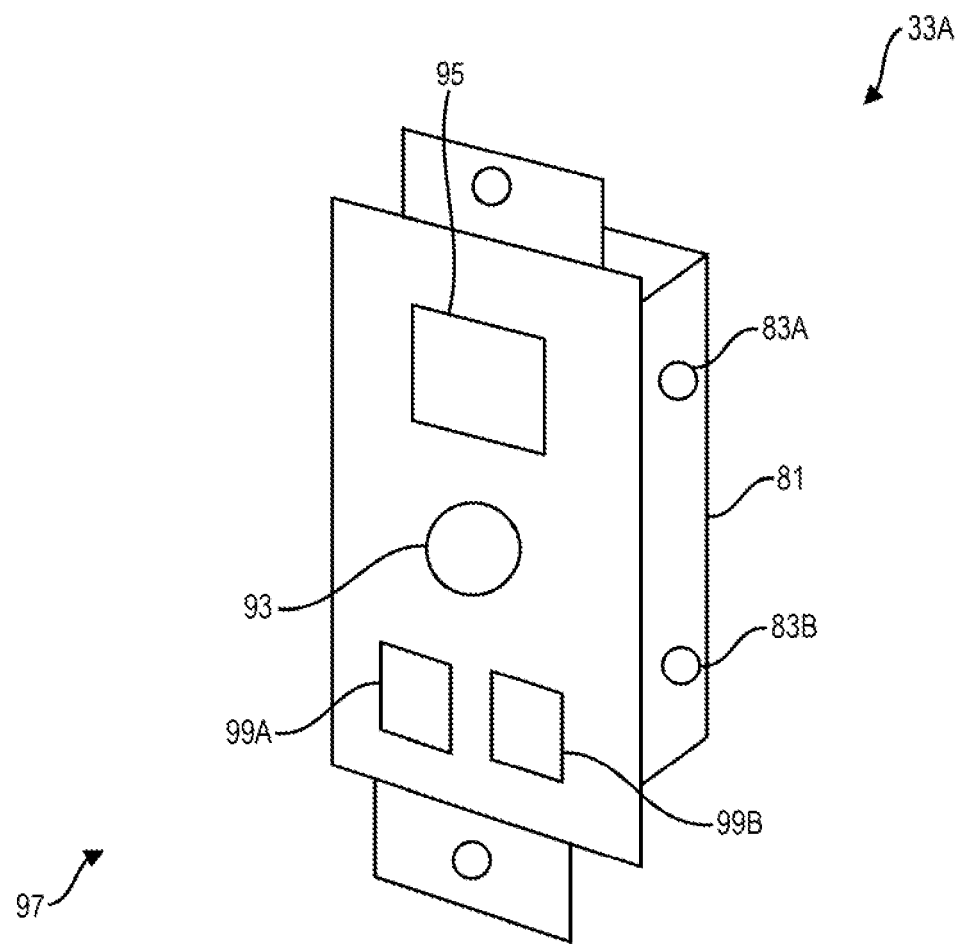
FIG. 19A is a front perspective of an electrical power switch of the present disclosure.
Figure 19B:
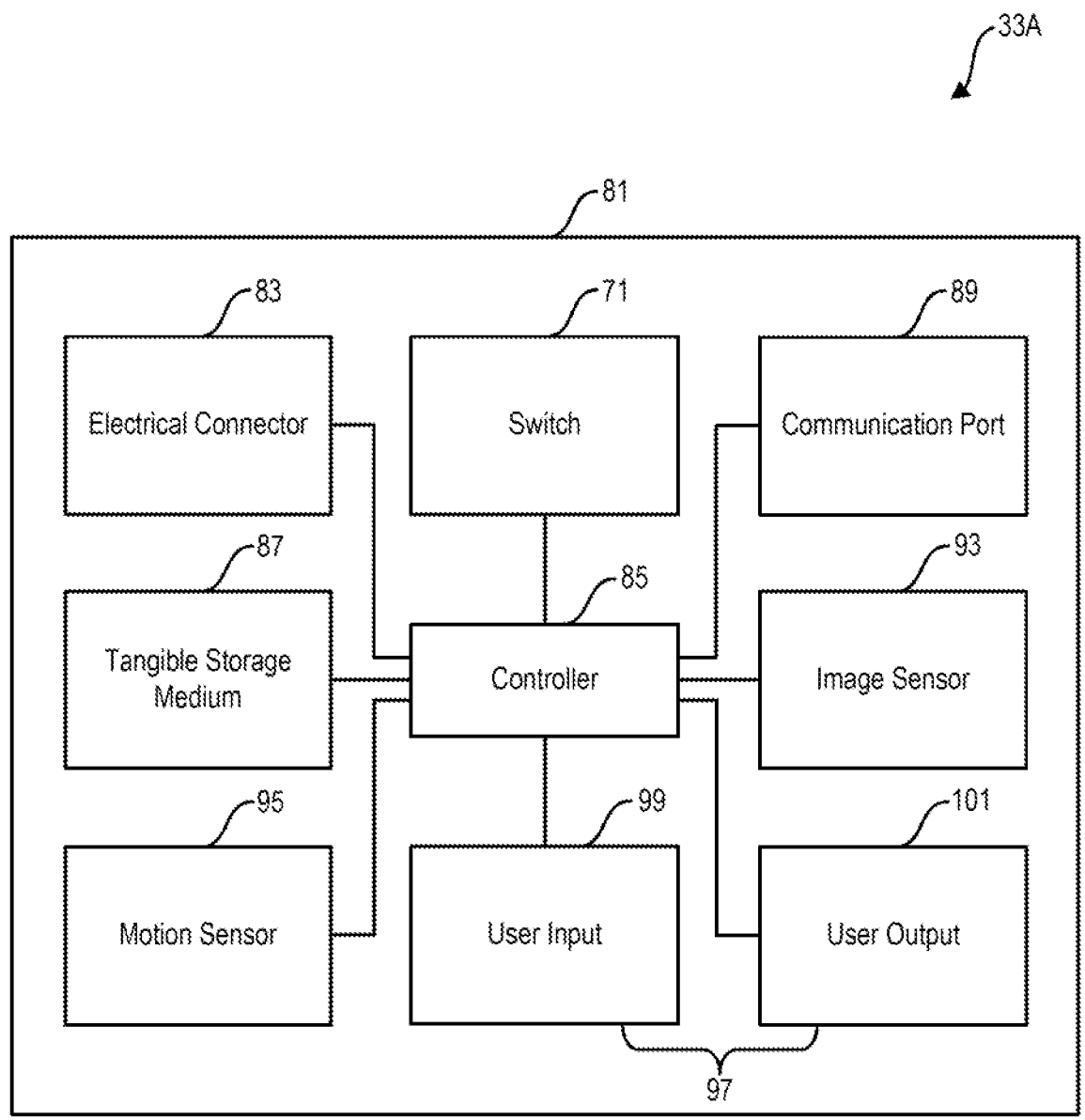
FIG. 19B is a schematic of the electrical power switch.

An example embodiment of an electrical power switch 33A (broadly, "electrical power switching control") is shown in FIGS. 19A and 19B. It will be appreciated the switches 33A, 33B could have an identical construction. The switch 33A includes a housing or frame 81 supports and houses a variety of electrical components. The switch 33A could be installed in a wall, such as in a switch box in a wall (e.g., via fasteners in upper and lower mounting tabs), and covered with a switch cover or plate, as would a conventional electrical power switch. The switch 33A defines a front face (e.g., including a front of the housing 81, where the user interface 97 is accessible) that faces out of the wall and is visible for a user to interact with the switch when the switch is installed in a wall. The switch 33A includes electrical connectors 83 (e.g., positive 83A and ground 83B) for connecting to the power grid of the structure. The switch 33A includes a switch controller 84 (e.g., microprocessor or processor) and a tangible storage medium 87 storing processor-executable instructions for execution by the switch controller. For example, the tangible storage medium 87 can store instructions to connect the switch 33A to the data communications network 40 when network availability is detected. The switch 33A includes at least one communications port 89 configured to communicatively couple the switch 33A to the data communications network 40. For example, the port 89 could comprise a Wi-Fi transceiver for transmitting and receiving wireless data signals on the Wi-Fi network. In other embodiments, the communications port 89 could comprise other types of wireless ports (e.g., Bluetooth, ZigBee, NFC, etc.) or wired ports (e.g., Ethernet, serial, etc.). Optionally, a cellular port 71 is also provided for communicatively coupling the camera to the cellular network 40C. The switch 33A includes a motion sensor 95 (e.g., passive infrared (PIR) sensor or microwave radar sensor) configured to detect movement in a field of view of the switch 33A (field of view of the sensor). Optionally, the switch can include an image sensor 93 for collecting photo or video image data. Moreover, the image sensor 93 could be used as a motion sensor. The controller 84 may execute instructions stored on the tangible storage medium 87, such as described above with respect to the cameras, to analyze the motion sensor and image sensor data to determine whether a security event occurred and transmit a corresponding signal to the server 38. The switch 33A includes a user interface 97 comprising a user input 99 and a user output 101. The user input 99 can comprise a button or other actuator 99A operable to "arm" or "disarm" the switch 33A to selectively put the switch in an active state of monitoring. The actuator could be a push button, a toggle, and/or a capacitive touch sensor. The user input 99 can also comprise an actuator 99B (e.g., lever, rocker, knob, push button, capacitive touch sensor, etc.) for switching on/off power supplied by the switch 33A on the electric grid by closing or opening the switch. The actuator 99B controls a switch 71, which could be an electronic or mechanical switch for opening and closing the circuit. The user output 101 can include an indicator such as an LED to indicate status information to the user. For example, the indicator could indicate whether the switch 33A is armed or disarmed, currently connected to the local area network, and/or could indicate whether motion is currently sensed. The user output 101 could also include an audio or visual alarm (e.g., speaker or light) configured to indicate whether motion is sensed and/or an alarm state.

Each switch 33A, 33B has a field of view (e.g., field of view of motion sensor 95 or image sensor 93) generally in the shape of a cone extending away from the switch. In the illustrated embodiment, the switches 33A, 33B are located to monitor objects also monitored by associated host-carried monitors 30A-30D. For example, a first switch 33A is located in the home interior to monitor the exterior door 14. A second switch 33B is located to monitor the vault door 22. In the illustrated embodiment, the field of view of each switch 33A-33B includes hosts carrying host-carried monitors 30A, 30D near the switch. Other arrangements can be used without departing from the scope of the present disclosure. For example, one or more switches could be used without an associated host-carried monitor, or vice versa.

The smart home components include a plurality of smart electrical outlets 34A-34C configured to selectively supply electrical power to electrical devices connected thereto. The smart electrical outlets 34A-34C can be located anywhere a user would like to have smart capabilities for an electrical device at an electrical power outlet. The smart electrical outlets 34A-34C can be used as a retrofit solution for adding smart capabilities to electrical devices. For example, a smart electrical outlet 34A-34C can provide the capability to turn on/off the electrical device connected thereto, based on programmed settings, from a user interface on a communication terminal 36A, 36B, and/or in coordination with operations of security monitoring apparatus. In the embodiment of FIG. 1, a first smart electrical outlet 34A is configured for selectively supplying electrical power to the light 24A, a second smart electrical power outlet 34B is configured for selectively supplying electrical power to the dehumidifier 24B, and a third smart electrical power outlet 34C is configured for selectively providing electrical power to the coffee maker 24C.

Figure 6:
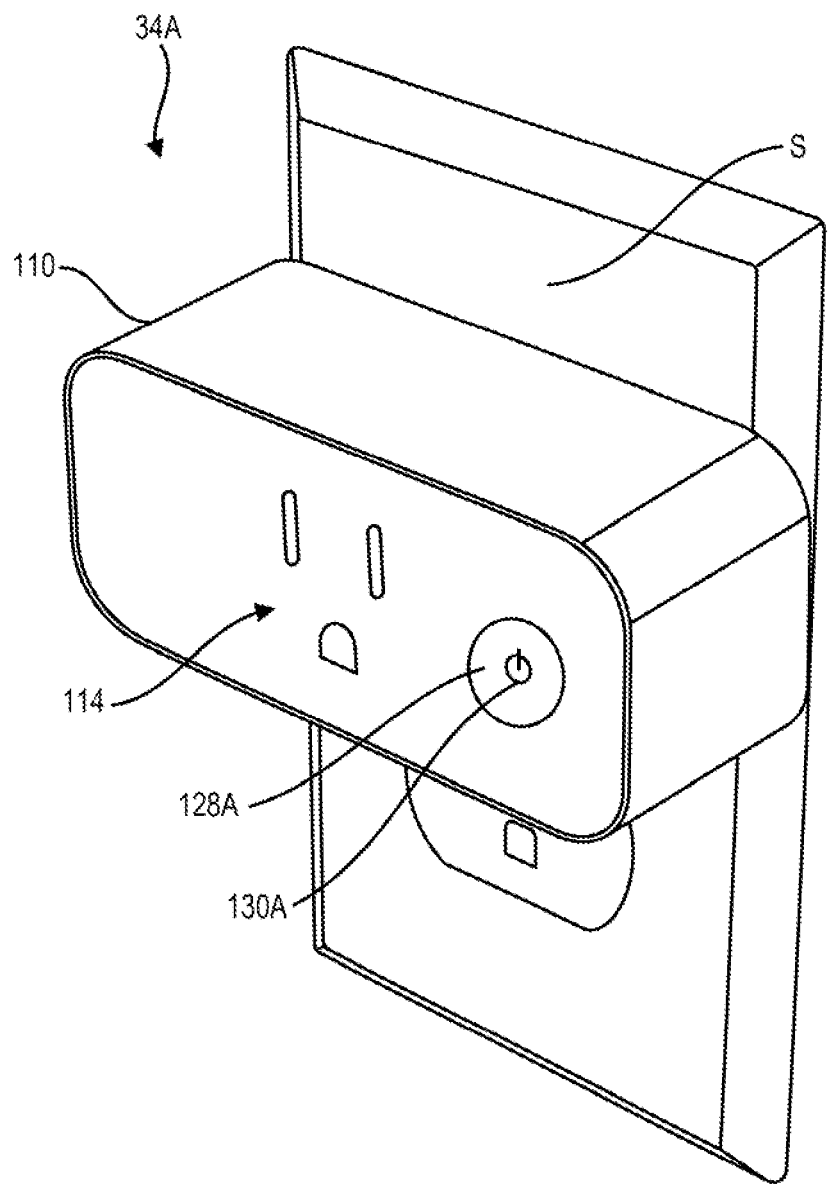
FIG. 6 is a perspective of a smart electrical outlet of the system.
Figure 7:
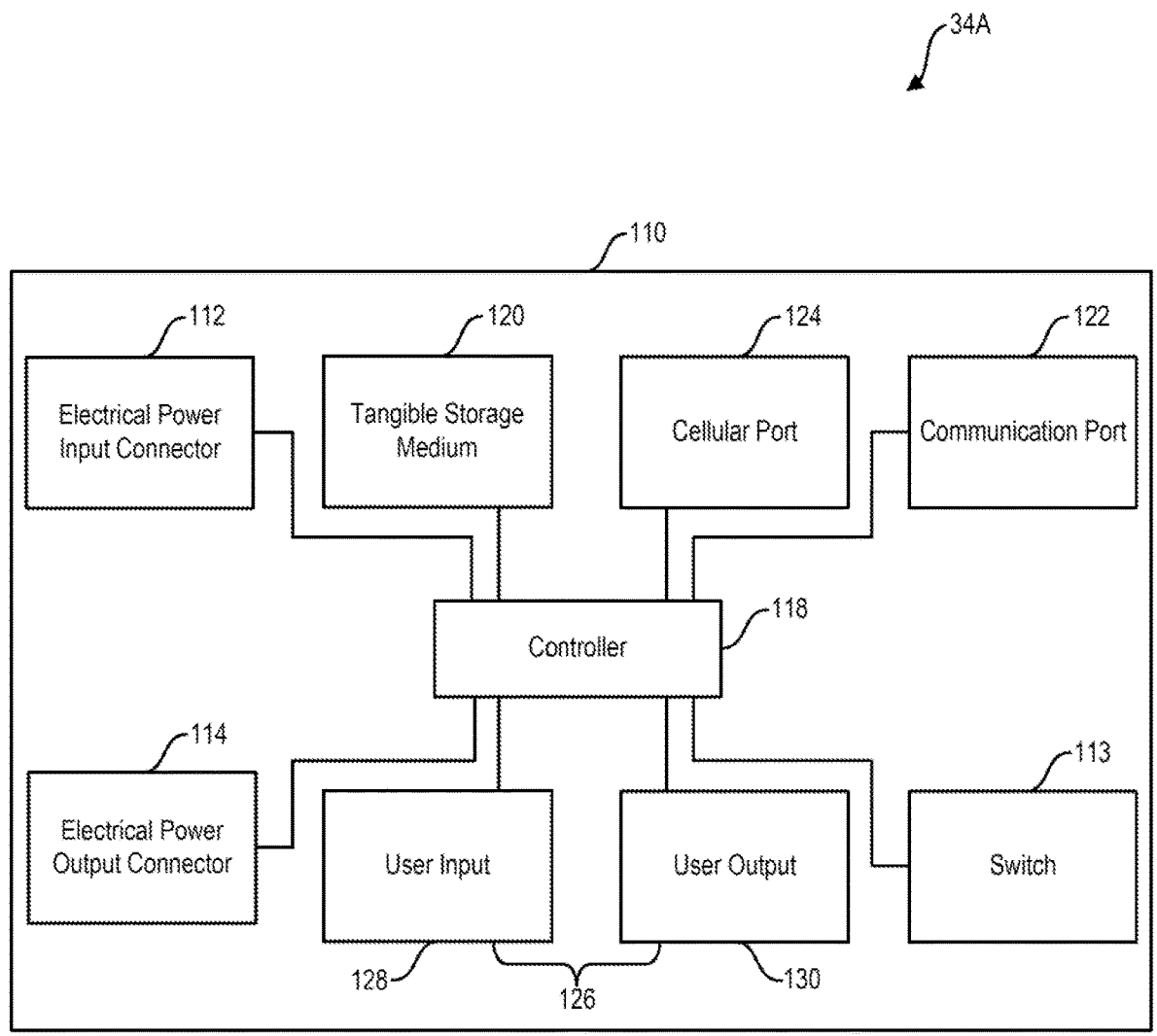
FIG. 7 is a schematic of the smart electrical outlet.

An example embodiment of a smart electrical power outlet 34A is shown in FIGS. 6 and 7. The other smart electrical power outlets 34B, 34C could have the same construction. The smart electrical power outlet 34A includes a housing 110 that supports and houses a variety of electrical components. The smart electrical power outlet 34A includes an electrical power input connector 112 configured to connect to a supply of electrical power S and includes an electrical power output connector 114 configured to connect to a load or device (e.g., lights, dehumidifier, etc.) to which the smart electrical power outlet is to selectively supply electrical power. In the illustrated embodiment, the electrical power supply connector 114 comprises a plug (e.g., including two or three prongs (broadly, "electrical connectors") configured to plug into a socket of an electrical power receptacle, such as a wall outlet S, connected to a power grid. The electrical power output connector 114 comprises a socket configured to receive an electrical plug (e.g., two or three prong plug) of a device to be supplied electrical power. The smart electrical power outlet 34A includes an electrical power outlet controller 118 (e.g., microprocessor or processor) and a tangible storage medium 120 storing processor-executable instructions for execution by the electrical power outlet controller. For example, the tangible storage medium 120 can store instructions to connect the smart outlet to the data communications network 40 when network availability is detected. The smart electrical power outlet 34A includes at least one communications port 122 configured to communicatively couple the outlet to the data communications network 40. For example, the port 122 could comprise a Wi-Fi transceiver for transmitting and receiving wireless data signals on the Wi-Fi network. In other embodiments, the communications port 122 could comprise other types of wireless ports (e.g., Bluetooth, ZigBee, NFC, etc.) or wired ports (e.g., Ethernet, serial, etc.). Optionally, a cellular port 124 is also provided for communicatively coupling the smart electrical power outlet to the cellular network 40C. The smart electrical power outlet 34A includes a user interface 126 comprising a user input 128 and a user output 130. In the illustrated embodiment, the user input 128 comprises a button 128A (broadly, "actuator"). For example, the button 28A could be used to activate (e.g., turn on) or deactivate (e.g., turn off) the smart outlet and/or to act as an override to settings of the smart outlet to manually turn the outlet on to supply power to the device connected thereto. The button could be a push button, a toggle, and/or a capacitive touch sensor. When the smart outlet is turned on, a switch 113 of the outlet is closed, to permit electrical power to flow through the plug from the electrical power supply connector 114 to the electrical power output connector 114. The switch 113 could be an electronic switch or a mechanical switch. The user output 130 includes an indicator 130A such as an LED (e.g., illuminated icon on button 128A) to indicate status information to the user. For example, the indicator 130A could indicate whether the smart outlet 34A is on or off. The smart electrical outlet 34A receives power from the electrical receptacle S in which the smart electrical outlet is plugged and thus does not need a battery power source, but such could be provided as a backup without departing from the scope of the present disclosure.

Figure 27:
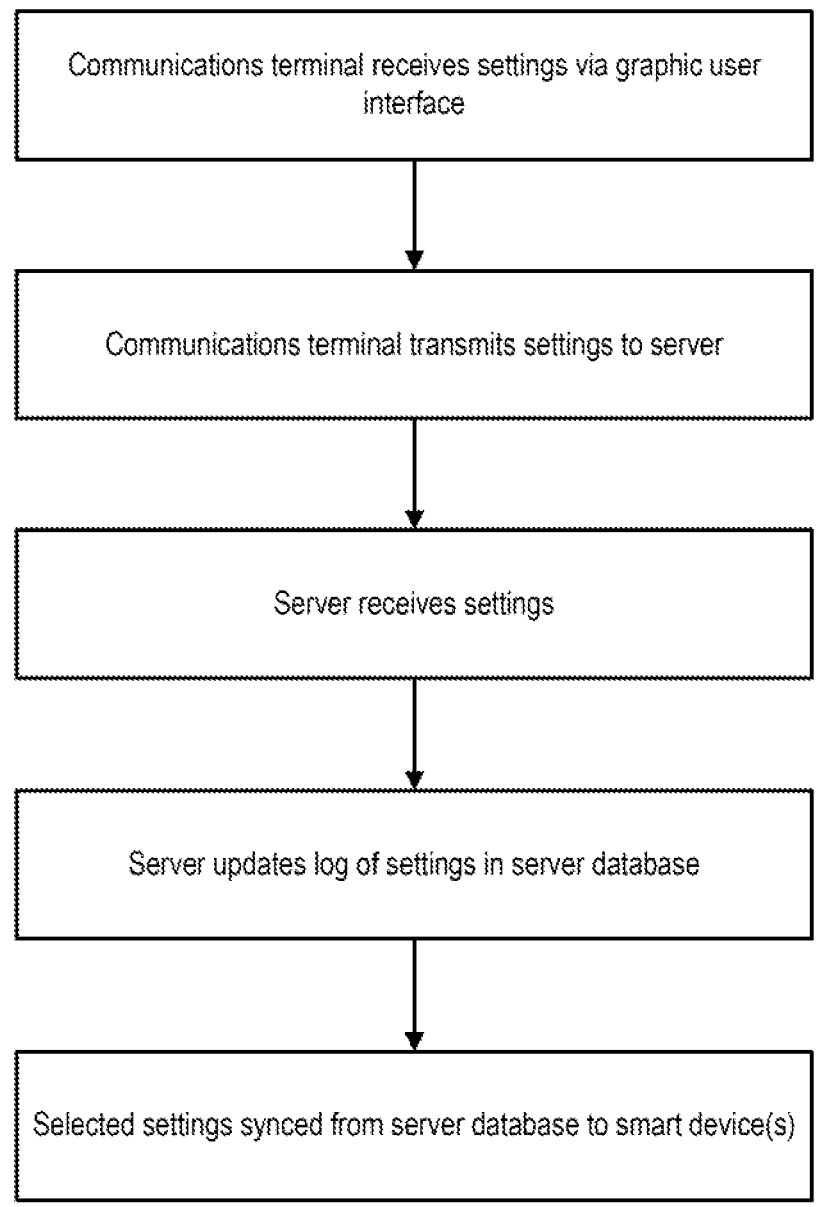
FIG. 27 is flow diagram showing an example process of programming settings of the system.

As mentioned above, the system includes at least one smart communication terminal 36A, 36B configured to permit the user to interact with the smart home apparatus 10B and security monitoring apparatus 10A. The smart communication terminal 36A, 36B could be a smart telephone, a tablet, and/or a computer (e.g., laptop or desktop computer). In the system shown in FIG. 1, two communication terminals 36A, 36B are shown, a first communication terminal 36A in the building 12, and a second communication terminal 36B outside the building. The second communication terminal 36B could be near the building or remote from the building (e.g., in another city, state, or country). In one embodiment, the smart home apparatus 10B and security monitoring apparatus 10A have limited user interfaces themselves, and a user interacts with such components primarily using an application (software) stored and executed on a communication terminal 36A, 36B networked with the smart home apparatus and/or security monitoring apparatus, such as indicated in FIG. 27. Other arrangements could be used without departing from the scope of the present disclosure. The system 10 is designed to permit connection of the communication terminals 36A, 36B to the data communications network 40 anywhere there is cellular communications and/or Internet service available.

Figure 8:
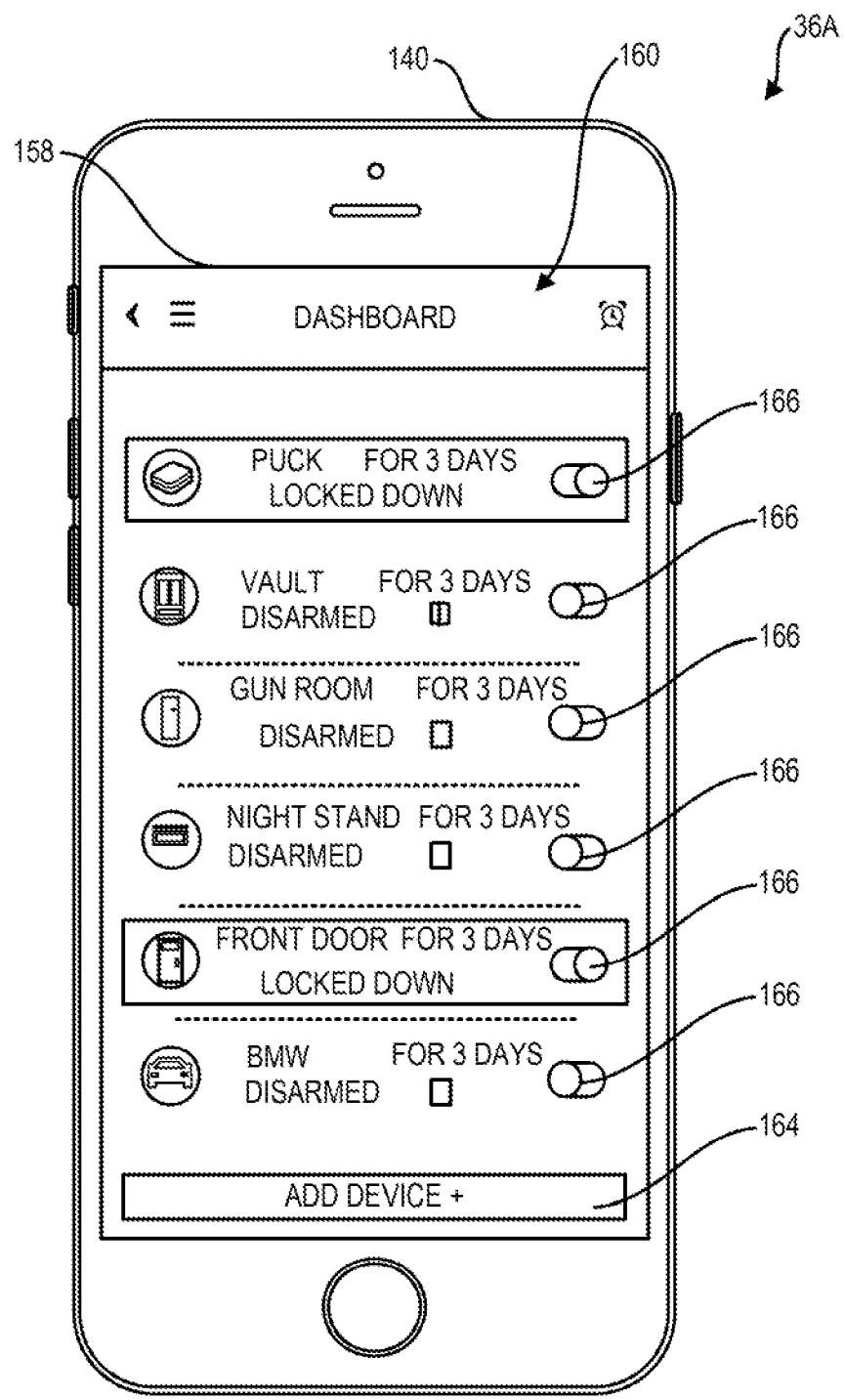
FIG. 8 is a communication terminal of the system showing a first view of a graphic user interface for the system.
Figure 9:
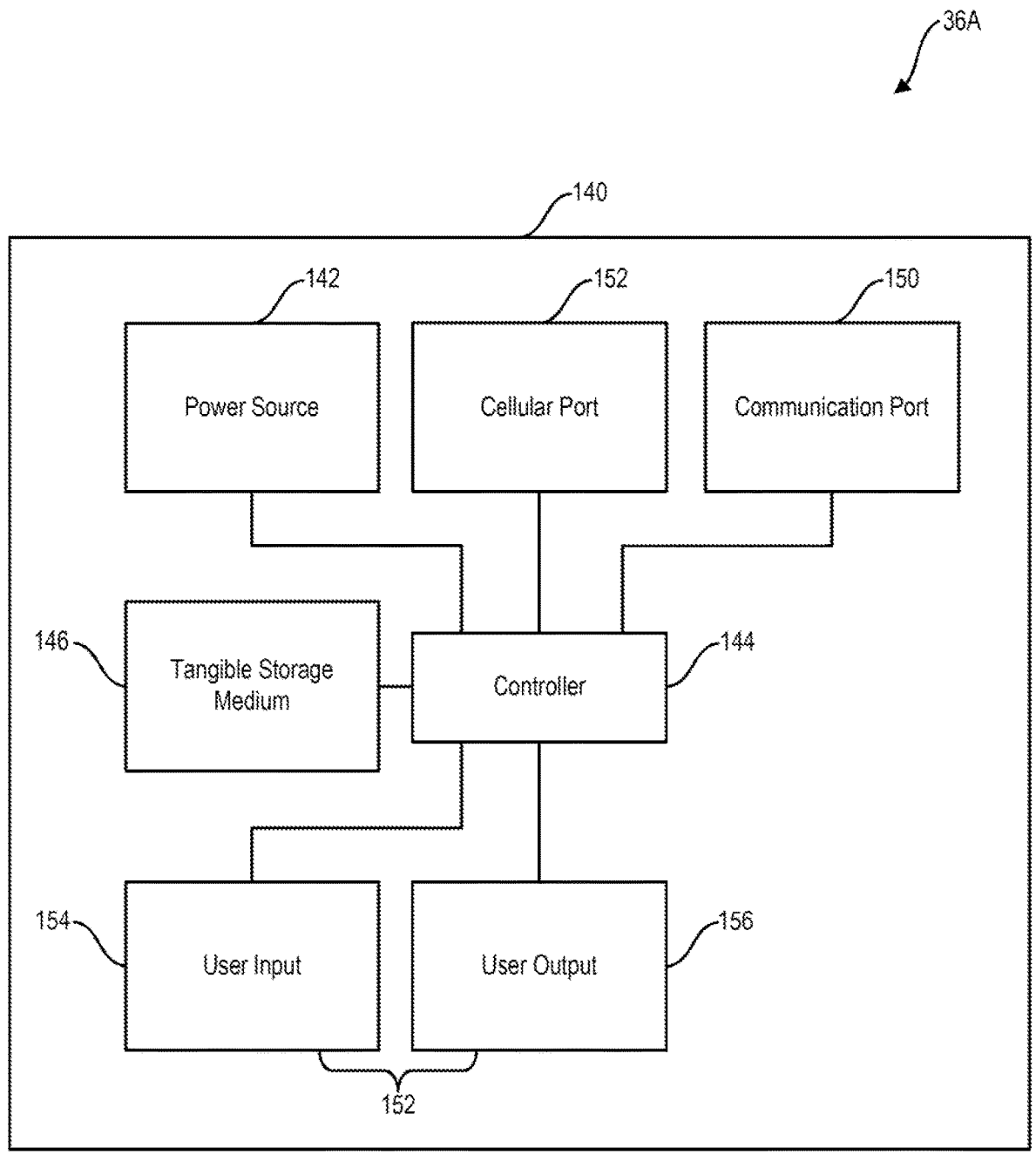
FIG. 9 is a second view of the graphic user interface for the system.

An example embodiment of a communication terminal 36A is shown in FIGS. 8 and 9. The other communication terminal 36B could have an identical construction. The communication terminal 36A includes a housing 140 that supports and houses a variety of electrical components. The communication terminal 36A includes an electrical power supply 142 (e.g., battery) configured to supply electrical power to the communication terminal. The communication terminal 36A includes a communication terminal controller 144 (e.g., microprocessor or processor) and a tangible storage medium 146 storing processor-executable instructions for execution by the communication terminal controller. For example, the tangible storage medium 146 can store instructions to connect the communication terminal 36A to the data communications network 40 when network availability is detected. The communication terminal 36A includes at least one communications port 150 configured to communicatively couple the communication terminal to the data communications network 40. For example, the port 150 could comprise a Wi-Fi transceiver for transmitting and receiving wireless data signals on the Wi-Fi network 40A. In other embodiments, the communications port 150 could comprise other types of wireless ports (e.g., Bluetooth, ZigBee, NFC, etc.) or wired ports (e.g., Ethernet, serial, etc.). Optionally, a cellular port 152 is also provided for communicatively coupling the communication terminal 36A to the cellular network 40C. The communication terminal 36A includes a user interface 152 comprising a user input 154 and a user output 156. In the illustrated embodiment, the user interface 152 comprises a touch screen 158. The user input 154 comprises touch sensitive areas of the touch screen, and the user output 156 comprises a display of the touch screen. The tangible storage medium 146 stores an application (processor-executable instructions or software) executable by the communication terminal controller 144 to implement a graphic user interface 160 (GUI) on the touch screen 158 of the communication terminal 36A for the smart home and security monitoring system 10 overall and/or for individual components thereof. An example view of the graphic user interface 160 for the system 10, and in particular a "dashboard" view, is shown on the touch screen 158 of the communication terminal 36A in FIG. 8. The dashboard includes sections (arranged in a column) each corresponding to a device of the system 10. An ADD DEVICE button 164 is provided to add security and/or smart apparatus to the system. When a component is added, the user can name the component according to its particular implementation or in some other way to assist the user in referencing the component in the user interface. For example, the "VAULT" monitor could correspond to the host-carried monitor 30D, the "FRONT DOOR" monitor could correspond to the host-carried monitor 30A, and the "BMW" monitor could correspond to the host-carried monitor 30C on the automobile 20. Sections are shown on the graphic user interface for monitors not shown in the embodiment of FIG. 1. In the graphic user interface 160, status of each monitor is displayed to the user. In particular, the monitors are shown as "LOCKED DOWN" (e.g., armed or active) or "DIS-ARMED" (e.g., inactive). The graphic user interface includes actuators 166 permitting the user to selectively change between armed and disarmed states for each component.

Figure 10:
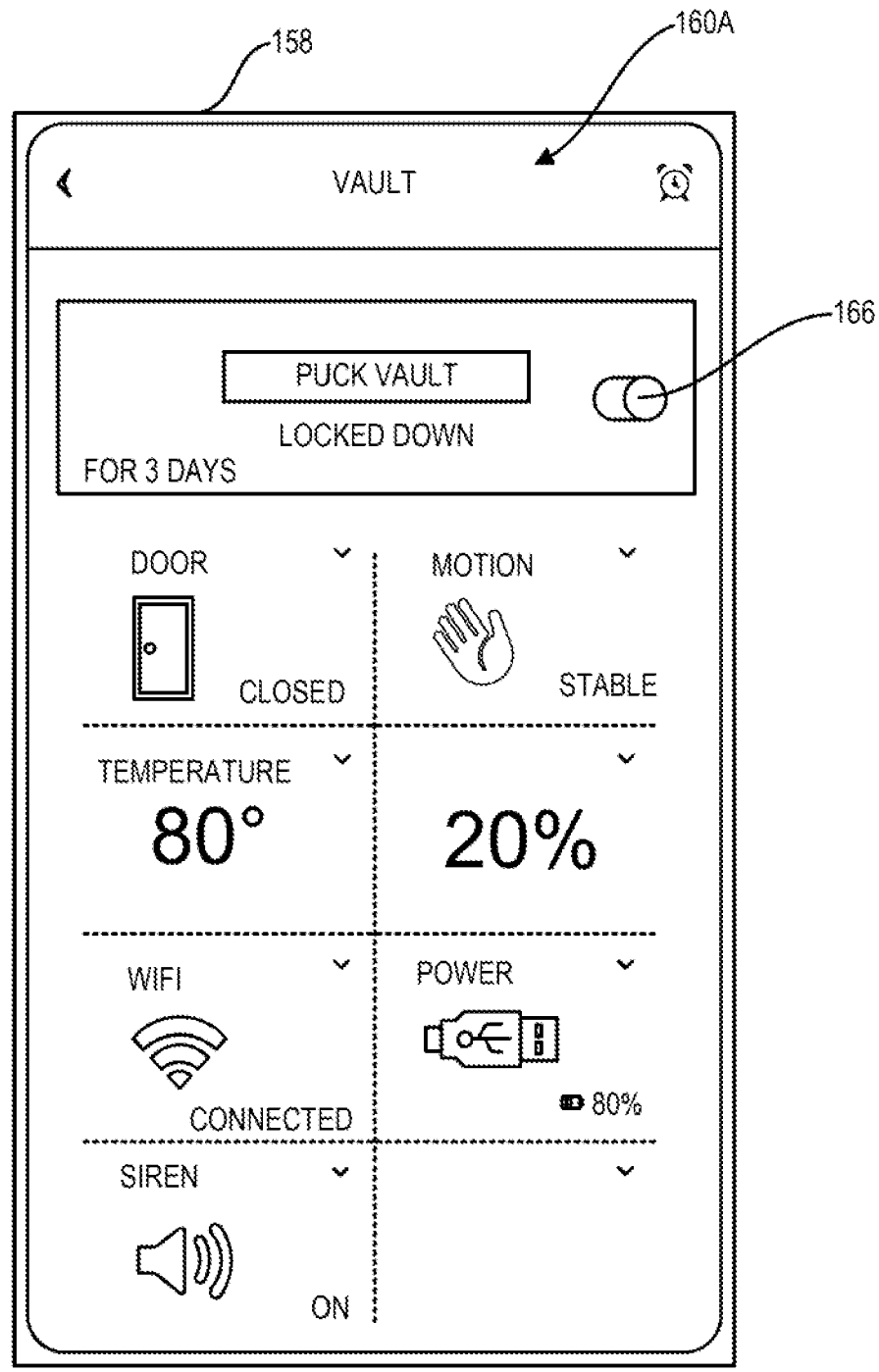
FIG. 10 is a schematic of the communication terminal.
Figure 11:
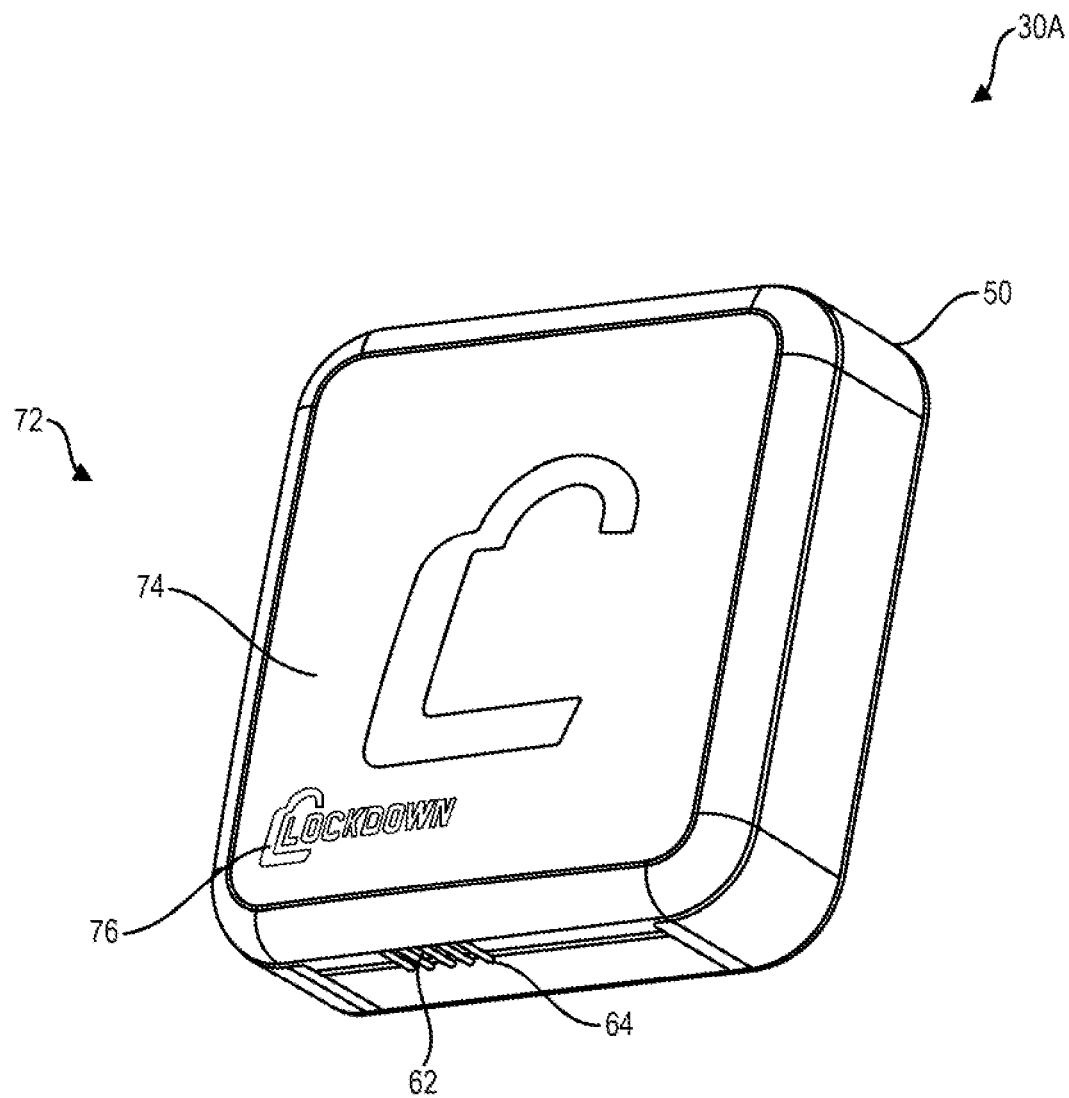
FIG. 11 is a front perspective of the monitor of FIG. 2.

In the dashboard view of FIG. 8, the user can select one of the specific components (e.g., by pressing a touch sensitive area of the touch screen 158 overlying the associated name or icon) to display a view in the graphic user interface for that specific component. For example, if the user were to select "VAULT" on the dashboard view of FIG. 8, the graphic user interface 160A for the host-carried monitor/puck 30D at that location (the vault door) would then be displayed on the communication terminal 36A as shown in FIG. 10. The graphic user interface 160A for that monitor 30D displays real time data sensed by that monitor (e.g., door closed, motion stable, temperature 80 degrees, 20% humidity, Wi-Fi connected, connected to USB power cord, batteries at 80% charge level, siren/alarm set to "on"). The graphic user interface 160D can also be used to view historical data. For example, a history (historical log) of door openings and closings, motion detections, temperature exceptions, humidity exceptions, etc., and associated dates and times, could be displayed by pressing on the touch screen 158 on or near the clock icon. Historical data associated with parameters (e.g., motion, temperature, humidity, etc.) could be viewed in a similar manner by actuating the touch screen 158 on or near the icon representing that parameter. Accordingly, it will be appreciated that the system permits a user to monitor real-time and historical data associated with the smart home apparatus 10B and/or security apparatus 10A from a remote location.

Figure 23:
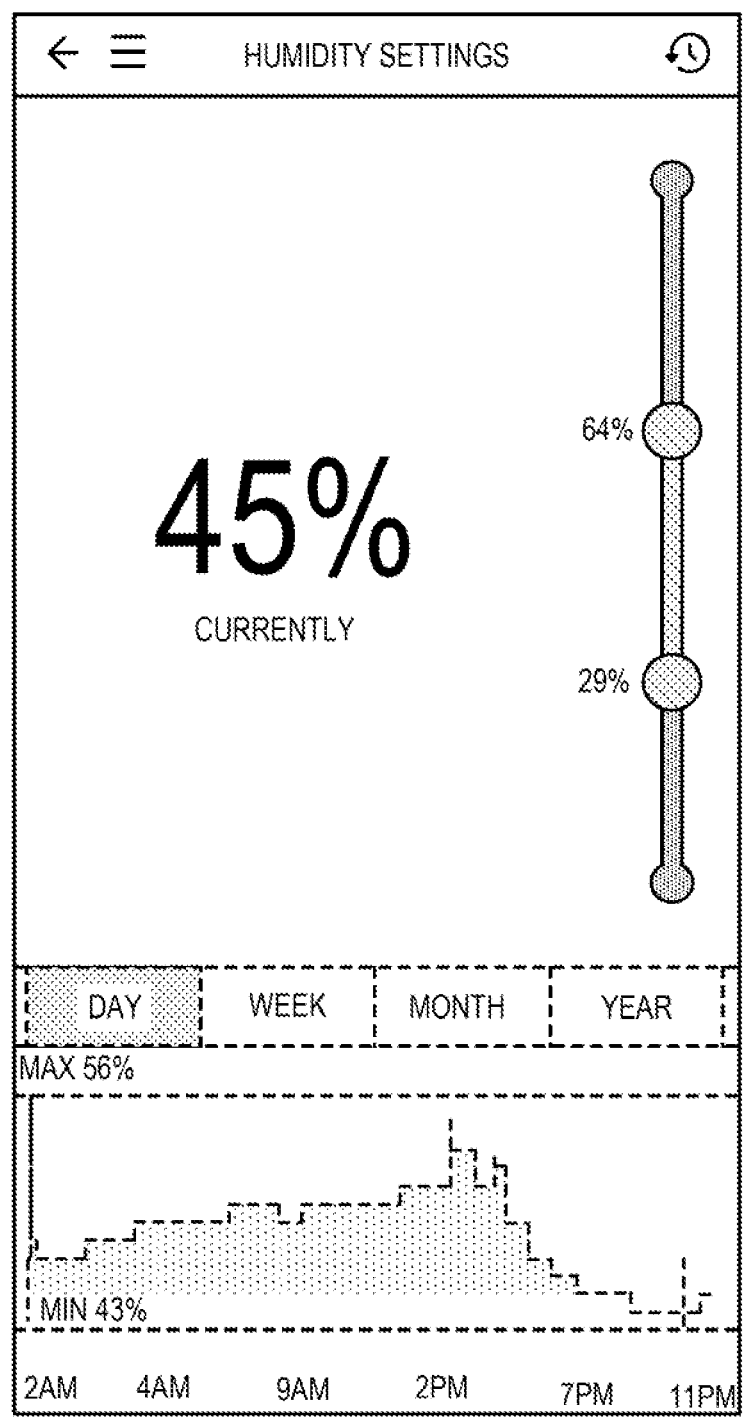
FIG. 23 is a humidity settings and log screen of a graphic user interface for the communication terminal of FIG. 8.
Figure 24:
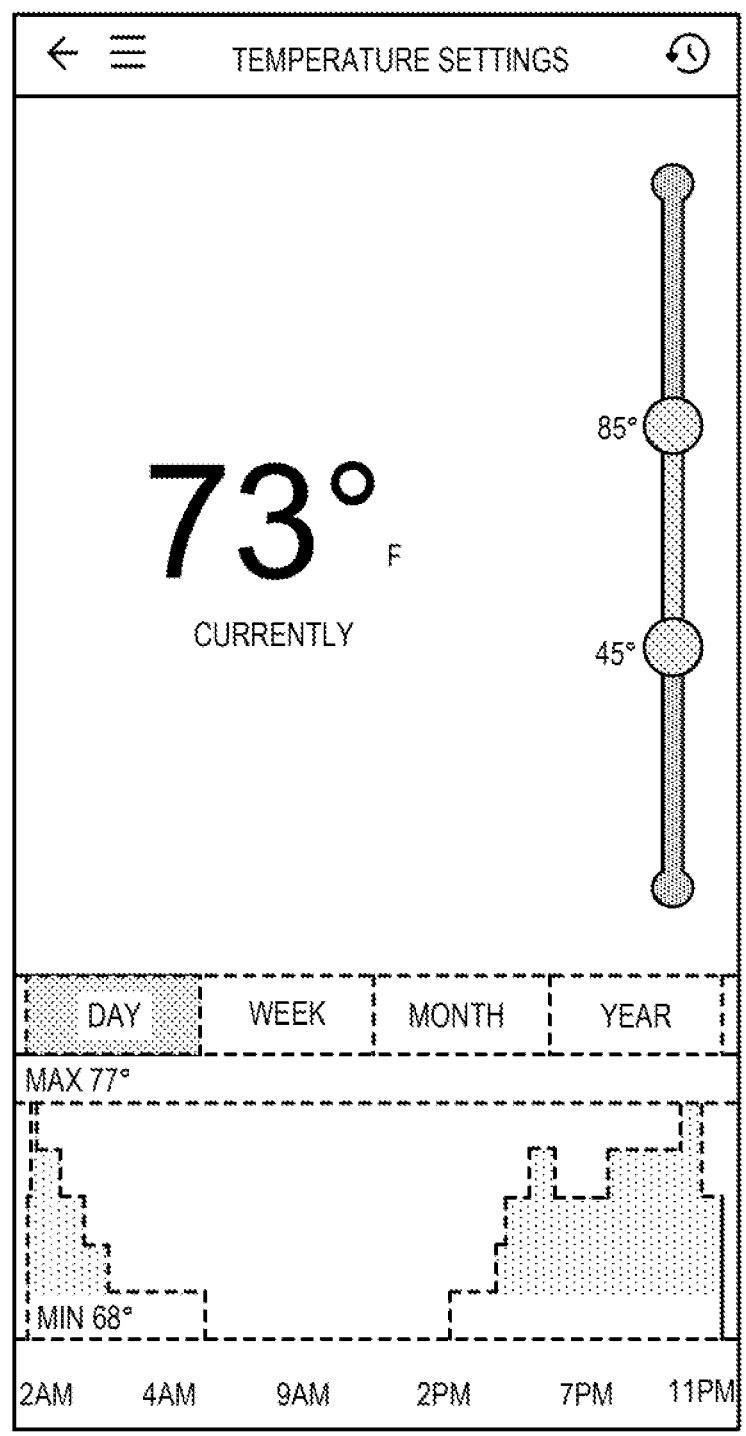
FIG. 24 is a temperature settings and log screen of a graphic user interface.
Figure 25:
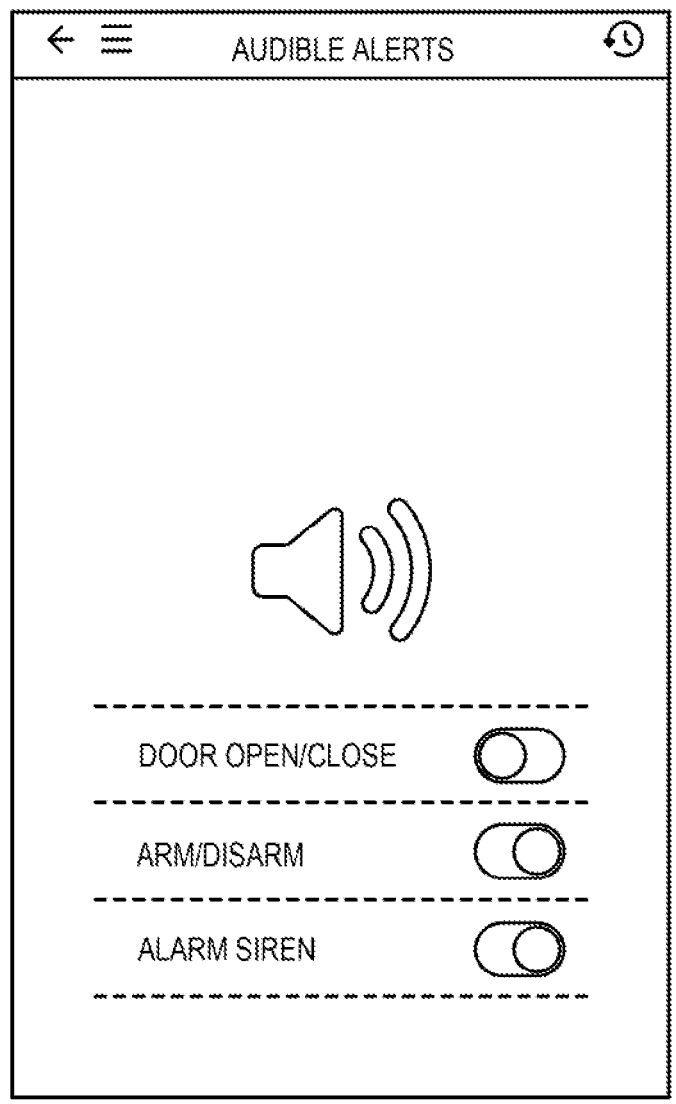
FIG. 25 is an audible alerts settings screen of the graphic user interface.
Figure 26:
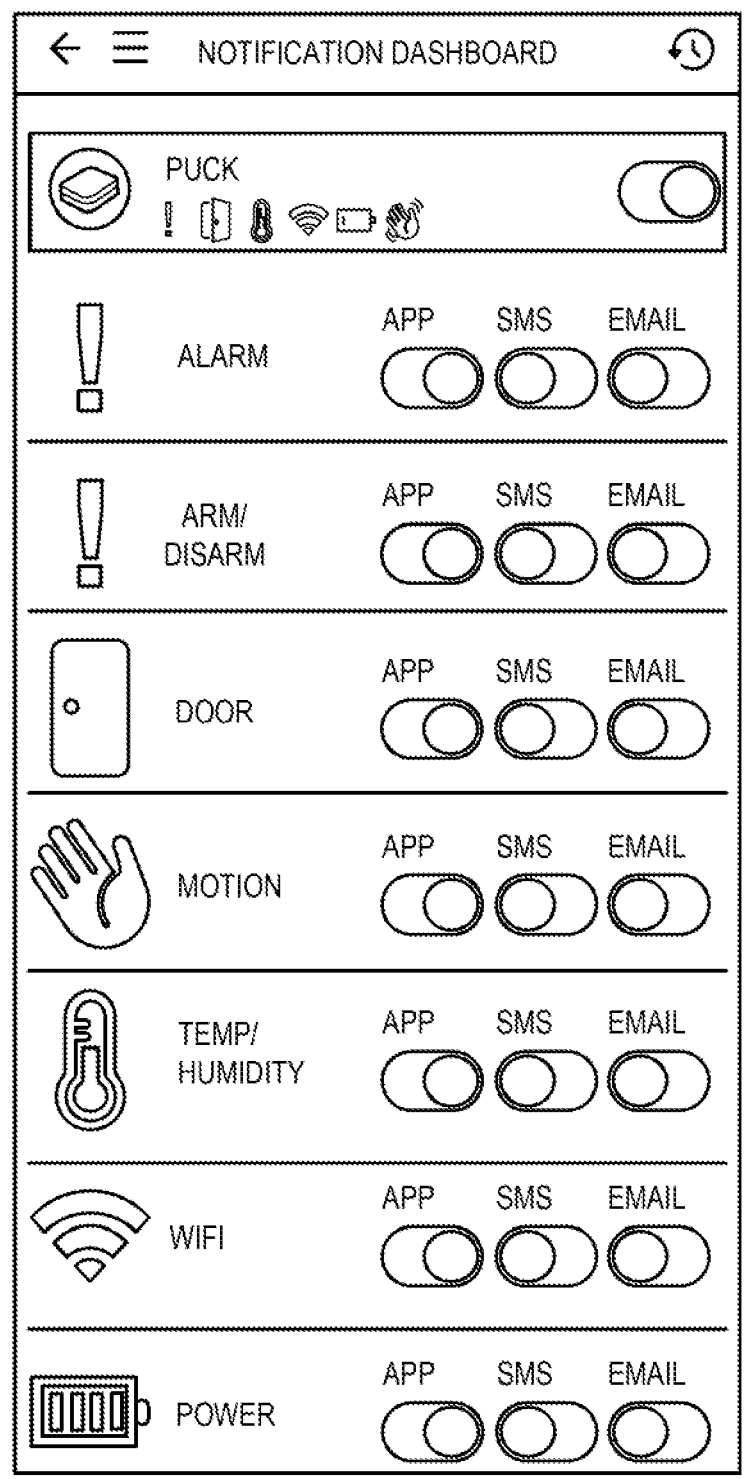
FIG. 26 is a notification dashboard settings screen of the graphic user interface.

The user can use the user interface 152 and app on the communication terminal 36A, 36B to program settings of the system 10 to use smart home and/or security monitoring capabilities of the system. The communication terminal 36A, 36B is responsive to user input (e.g., user actuation of the touch screen 158) to transmit signals to the at least one remote computer 38 (the cloud or server) to change instructions and/or settings for operating the smart home and/or security apparatus. For example, referring to the view of the user interface shown in FIG. 10, if the user were to press the Temperature tile, the user interface screen of FIG. 24 would appear. Using the slider on the right side, the user can change settings of upper and lower temperature values to set a non-exception range of temperature, outside of which would be considered a temperature exception. Likewise, in the view of FIG. 10, if the user were to press the Humidity tile, the user interface screen of FIG. 23 would appear. Using the slider on the right side, the user can change settings of upper and lower humidity values to set a non-exception range of humidity values, outside of which would be considered a humidity exception. Such exceptions for temperature and humidity would be determined by the smart device controller by comparing the preset ranges to the current sensed values for temperature and humidity. As another example, the user could press the Siren tile (FIG. 10) to navigate to the user interface screen shown in FIG. 25, which permits the user to change settings (on/off) whether an audible alert is emitted by the host-carried monitor upon door open/closure, when the host-carried monitor is armed/disarmed, and/or when a security event is detected (alarm siren). As yet another example, the user can navigate to the user interface screen of FIG. 26 to select whether and what type of notifications the server sends to the communication terminal responsive to various events (e.g., door opening/closing, temperature or humidity exception, security event detected). In the view shown in FIG. 26, the settings are arranged to deliver notifications for all of the possible alert types (e.g., alarm, arm/disarm, door) via the app (e.g., causing a notification window to appear on the user's communications terminal) and not via SMS or email. The server 38 may sync some of the instructions it receives from the communication terminal to the relevant smart device(s), such as instructions on how to determine whether a security event has happened (e.g., motion security event, position security event, temperature or humidity security event) so that such security event can be communicated to the server accordingly.

The remote server 38 includes at least one processor 38A (broadly, "system controller") and at least one tangible storage medium 38B storing instructions executable by the processor. The tangible storage medium 38B stores a database 38C (an example of which is shown in FIGS. 31A-31B) including instructions or settings associated with individual or multiple security monitoring apparatus 10A and smart home apparatus 10B for controlling operation thereof. The settings data in the database 38C is modified or updated responsive to user input received at the user interface of a communications terminal (e.g., via the screens shown in FIGS. 23-26), and some of the settings data (related to device-local actions, such as criteria or parameters to determine security event) may be synced from the server 38 to the relevant smart device. The at least one processor 38A of the at least one remote computer 38 (server) acts as a master processor for the system 10. In operation, signals from the various smart home and security monitoring apparatus 10B, 10A (e.g., security event signals representing security sensor data) are transmitted via the data communications network 40 to the server 38, where the data is logged in the database 38C in the server. The master processor 38A is responsive to such data and settings or instructions stored in the database 38C to send notifications to the communication terminals 36A, 36B (and/or an email account) and/or to send control signals (e.g., action instructions or settings updates) to the smart home and/or security monitoring apparatus 10B, 10A to control operation thereof. Examples of such data communication and operation of the system will be described in further detail below. In general, an example process is outlined in FIG. 29, in which the processor 38A would reference the database of FIGS. 31A-31B.

In general, security monitoring apparatus 10A (e.g., host-carried monitor 30A-30D, electrical power switch 33A-33B) can communicate sensor data on the data communications network 40 to the at least one remote computer 38 (the server), which logs the data in the server 38C, and may send responsive control instructions to components of the system 10. Responsive to the sensor data, and depending on instructions stored in the tangible storage medium 38B of the at least one remote computer 38 (e.g., previously set using the user interface of a communication terminal), notifications may be sent to one or more communication terminals 36A, 36B. For example, communication terminals 36A, 36B may receive notification signals from the at least one remote computer 38 via the data communications network 40 to display a notification to the user associated with the sensor data. Notification signals may be sent via email, SMS (text message), or via the app (to be displayed as a notification on screen). Example notifications include "high humidity," "high temperature," "low temperature," "door open," "motion sensed," "tampering sensed," "low battery," etc. Also, responsive to the sensor data, and depending on instructions stored in the tangible storage medium 38B of the at least one remote computer 38, control signals (action instructions) may be sent to other components of the system. For example, control instructions may cause a camera 32A-32D associated with the respective host-carried monitor 30A-30D (e.g., having in its field of view the host carrying the host-carrying monitor) to start recording video (broadly, "capture image data"), and/or cause a smart electrical outlet 34A-34C associated with the host-carried monitor to supply power or cease supplying power to an electrical device (e.g., dehumidifier, light, coffee maker, etc.) connected thereto. As another example, control instructions may cause a camera 32A-32D associated with the respective electrical power switch 33A, 33B to start recording video, and/or cause the electrical power switch 33A, 33B to supply power or cease supplying power. Moreover, responsive to sensor data, the at least one remote computer 38 may change settings or instructions stored in the cloud for controlling operation of one or more of the smart home and/or security monitoring apparatus 10B, 10A. For example, when the front door 14 is opened and closed (i.e., the user leaves the home) the at least one remote computer 38 could change the mode or status of the security monitoring apparatus 10A to "armed" (e.g., LOCKED DOWN), and send control signals to the respective security monitoring apparatus to operate as programmed or preset in an armed mode. Various events and examples of associated reactions are outlined in FIGS. 31A-31B.

Each camera 32A-32E can communicate sensor data (e.g., motion sensor data or image sensor data) on the data communications network 40 to the at least one remote computer 38 (the cloud), which logs the data in the server 38C. While armed, the cameras 32A-32E may collect image sensor data continuously, when motion is sensed by the camera, or when instructed to by the at least one remote computer 38 (e.g., responsive to sensor data from another component of the system and/or instructions from a communication terminal). Responsive to the image sensor data, depending on the instructions stored in the tangible storage medium 38B of the at least one remote computer 38 (e.g., previously set using the user interface of a communication terminal), notifications may be sent to one or more communication terminals 36A, 36B. For example, communication terminals 36A, 36B may receive notification signals from the at least one remote computer 38 via the data communications network 40 to display a notification to the user (e.g., via email, text message, or the app) that motion has been detected and/or sensor image data has been collected. The user could then open the application on the communication terminal 36A, 36B and view the logged motion data and/or image sensor data (e.g., photos or video). Moreover, on the communication terminal 36A, 36B via the app, the user could see real time image sensor data (e.g., video feed) from the respective camera 32A-32E and/or other cameras.

Each smart electrical outlet 34A-34C can be controlled by the at least one remote computer 38 in response to sensor data received from security monitoring apparatus 10A and/or smart home apparatus 10B. For example, responsive to motion sensor data, image sensor data, environmental sensor data, or other sensor data (or security event signals representative of same) from one or more of the security apparatus 10A (e.g., host-carried monitors 30A-30D or cameras 32A-32E), and based on settings or instructions stored on the tangible storage medium 38B (e.g., previously set using the user interface of a communication terminal 36A, 36B), a control signal or action instruction could be sent to one or more of the smart electrical outlets 34A-34C to supply electrical power to an electrical device connected thereto. For example, a light 24A, dehumidifier 24B, coffee maker 24C, etc. connected to a smart electrical outlet may be turned on/off. Moreover, each smart electrical outlet 34A-34C could be controlled via a communication terminal 36A, 36B to turn on/off electrical power in an ad hoc fashion (e.g., in addition to or overriding the programmed settings or instructions stored for that smart electrical outlet in the cloud). Usage data for the smart electrical outlet 34A-34C can be logged in the cloud 38 and viewable on the communication terminals 36A, 36B.

In view of the above, it will be appreciated that a user can program various instructions or settings for the individual components as desired for a particular application, which may include operating in coordination or cooperation with other components of the system 10. For example, the system 10 as illustrated in FIG. 1 could be programmed such that when the host-carried monitor 30A on the exterior door 14 detects the door being open and/or detects vibration or other movement of the door, the sensor data communicated to the at least one remote server 38, and the stored settings or instructions, could cause the at least one remote server 38 to send control signals to the first and/or second cameras 32A, 32B to begin collecting image data. If the host-carried monitor 30C on the vehicle 20 indicates movement, the camera 32C in the garage could be instructed to begin collecting sensor image data. If the host-carried monitor 30B on the bedroom door 16 senses the door being open and/or motion of the door, the camera 32D could begin collecting image sensor data. As another example, if the host-carried monitor 30D on the vault door 22 detects the door being open and/or motion of the door, the smart electrical outlet 34A could be instructed to supply power (or discontinue supplying power) to the light 24A in the vault. If the host-carried monitor 30D on the vault door 22 detects high humidity, the smart electrical outlet 34B could be instructed to supply power to the dehumidifier 24B to decrease the humidity. The coffee maker 24C could be supplied power by the smart outlet 34C at a programmed time or times, which could be stored as an instruction the cloud and cause a corresponding control signal to be sent to the smart outlet 34C. Moreover, a space heater could be connected to the smart outlet 34C, which could receive instructions from the server 38 to supply electrical power (and thus heat) based on a signal from a host-carried monitor 30 indicating a temperature exception (e.g., below temperature threshold). The light 24A and dehumidifier 24B could be operated in a similar fashion. If an electrical power switch 33A, 33B detects movement in its field of view (e.g., field of view of motion sensor), the remote computer 38 could instruct the switch to start or stop supplying electrical power, could instruct one or more cameras 32A-32E to begin collecting image data, and/or could instruct one or more of the smart devices to sound an audible alarm. Motion data from the switch 33A, 33B can be stored by the remote server 38, and real time and historic motion data can be viewable by the user on the communication terminal 36A, 36B. In all of the above examples, an associated notification could be sent to the user's communication terminal to inform the user of the sensed data and/or the response activity. Moreover, the host-carried monitors 30A-30D, cameras 32A-32E, and/or smart outlets 34A-34C can be armed and/or disarmed automatically (e.g., at preset time(s), based on occurrence of certain events, etc.) or manually by a user via a communication terminal 36A, 36B (e.g., via actuators 166). When a component is armed, it operates such as described above (e.g., records sensor data, etc.), and when a component is disarmed it may be in an idle or inactive state.

Figure 15:
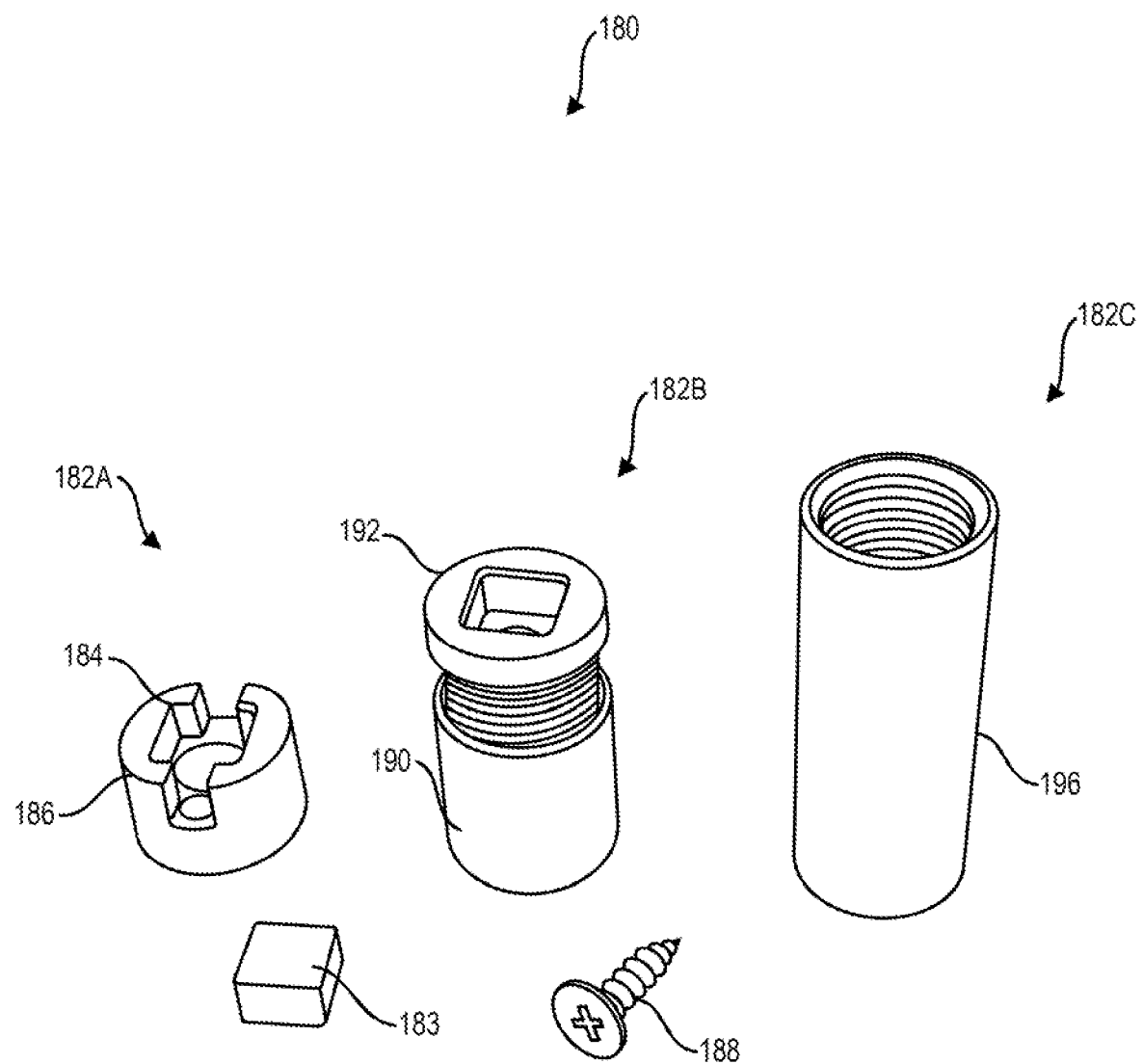
FIG. 15 is a perspective of a kit for mounting a magnet associated with the monitor.
Figure 17:
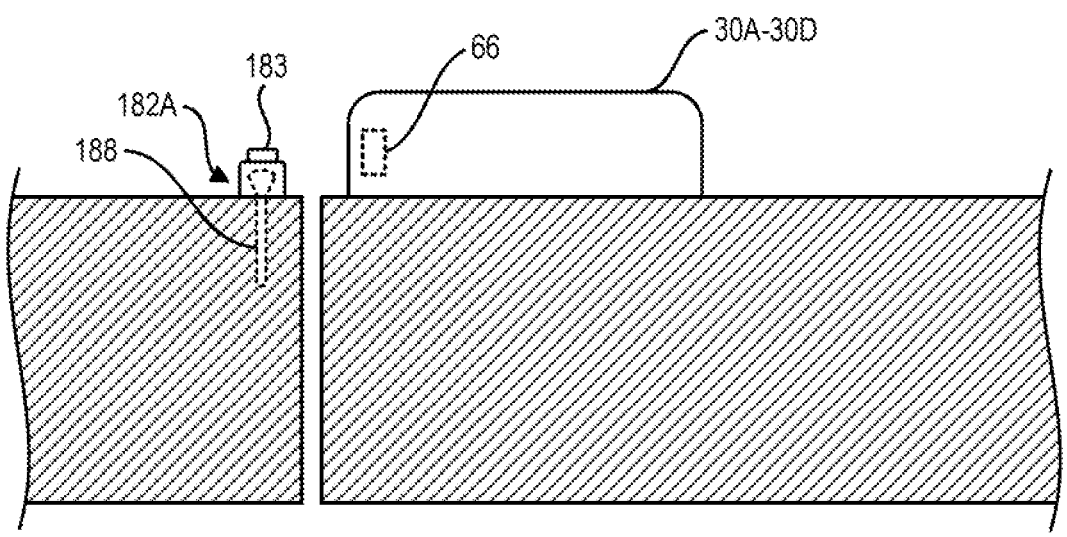
FIG. 17 is a bottom view of the monitor and magnet of FIG. 16.
Figure 18:
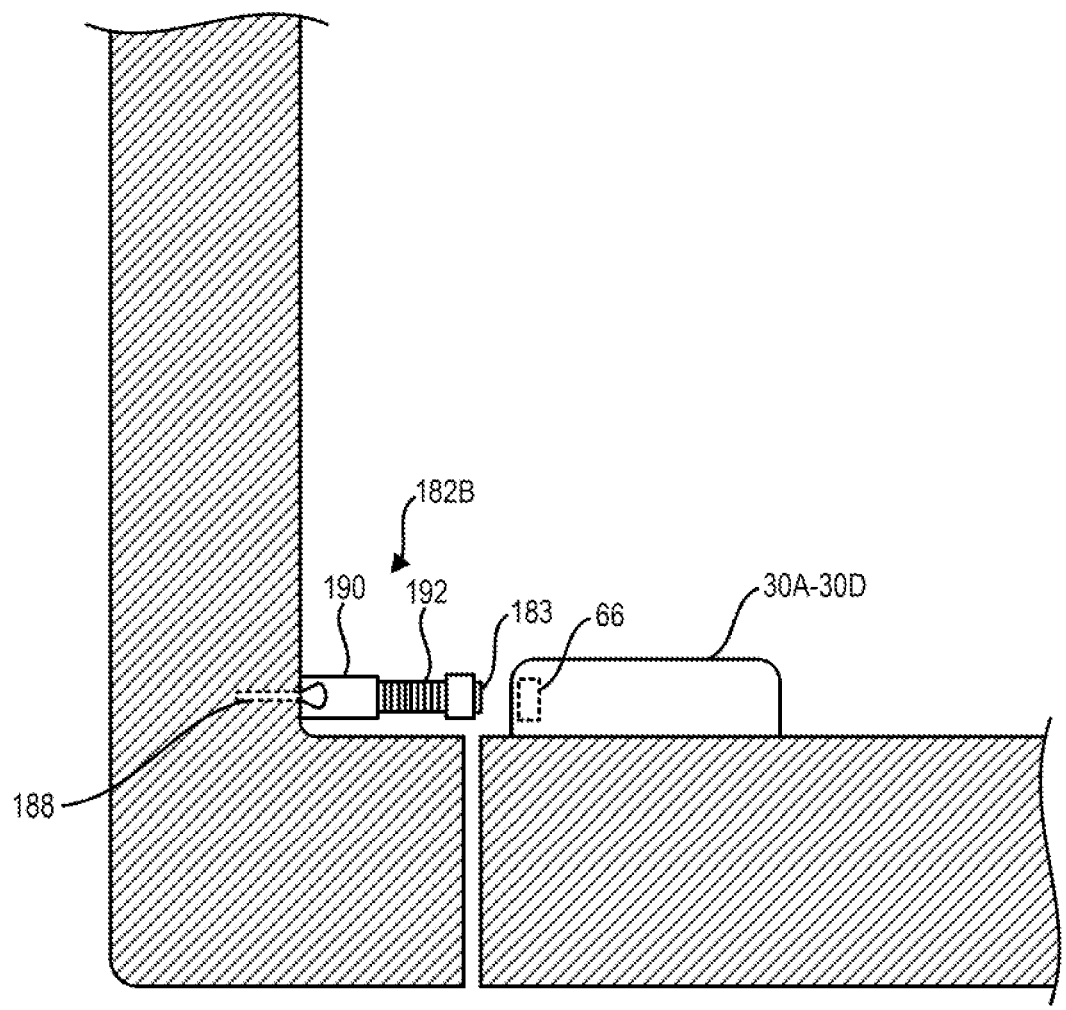
FIG. 18 is a bottom view of a monitor and magnet in a different installation.

Referring to FIGS. 15-18, a mount system 180 is shown for mounting the magnet or reference 183 (similar to the magnet 68 discussed above) in position for being sensed by the position sensor of the monitor. As shown in FIG. 15, the mounting system 180 includes a kit of mounts 182A-182C for holding the magnet 183 in position. The kit includes a first mount 182A and includes first and second bases 190, 196 selectively combinable with a holder 192 to define second and third mounts 182B, 182C. The first mount 182A includes a base 186 and a holder 184 defining a recess in which the magnet is receivable to be frictionally held. As shown in FIG. 17, the first mount 182A can be secured to a mounting surface using a fastener 188 (e.g., screw) passing through the mount. Alternatively, adhesive or other means can be used. As shown in FIG. 18, the second mount 182B is connected to a mounting surface by passing a fastener 188 through the base 190 and then connecting the holder 192 to the base. The bases 190, 196 include respective female threaded openings in which the holder 192 having a corresponding male threaded portion is threadably receivable. The holder 192 includes a recess in which the magnet is receivable to be frictionally held. The first and second bases 190, 196 have similar constructions except the second base is longer than the first base. The arrangement is such that the first mount 182A can be used when the magnet 183 can be located relatively close to the mounting surface, and the second and third mounts 182B, 182C can be used when the magnet needs to be farther from the mounting surface to be properly sensed by the position sensor of the monitor. The holder 192 can be threaded into or out of the base 190 or 196 a desired amount such that the second and third mounts are adjustable to change the distance between the magnet and the mounting surface. For example, the second mount 182B can be adjusted to change the distance between the mounting surface and magnet in the inclusive range of 1-2 inches, and the third mount 182C can be adjusted to change the distance in the inclusive range of 2-3 inches. Accordingly, the magnet 183 can be mounted in many different ways to be sensed by the position sensor of the monitor. For example, compare the mounting of the magnet 183 in FIGS. 17 and 18.

Figure 20:
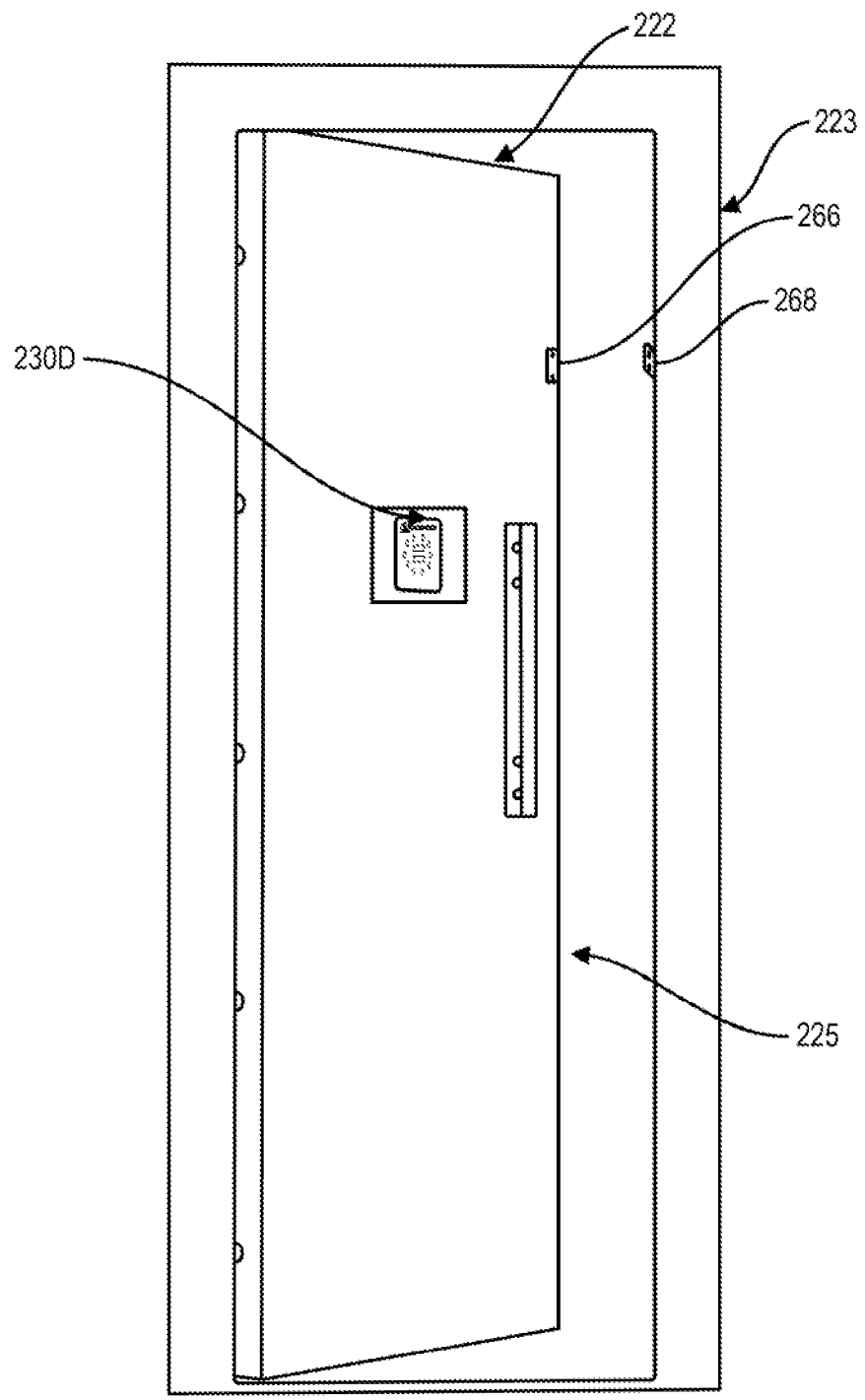
FIG. 20 is a perspective of a door assembly of the present disclosure.
Figure 21:
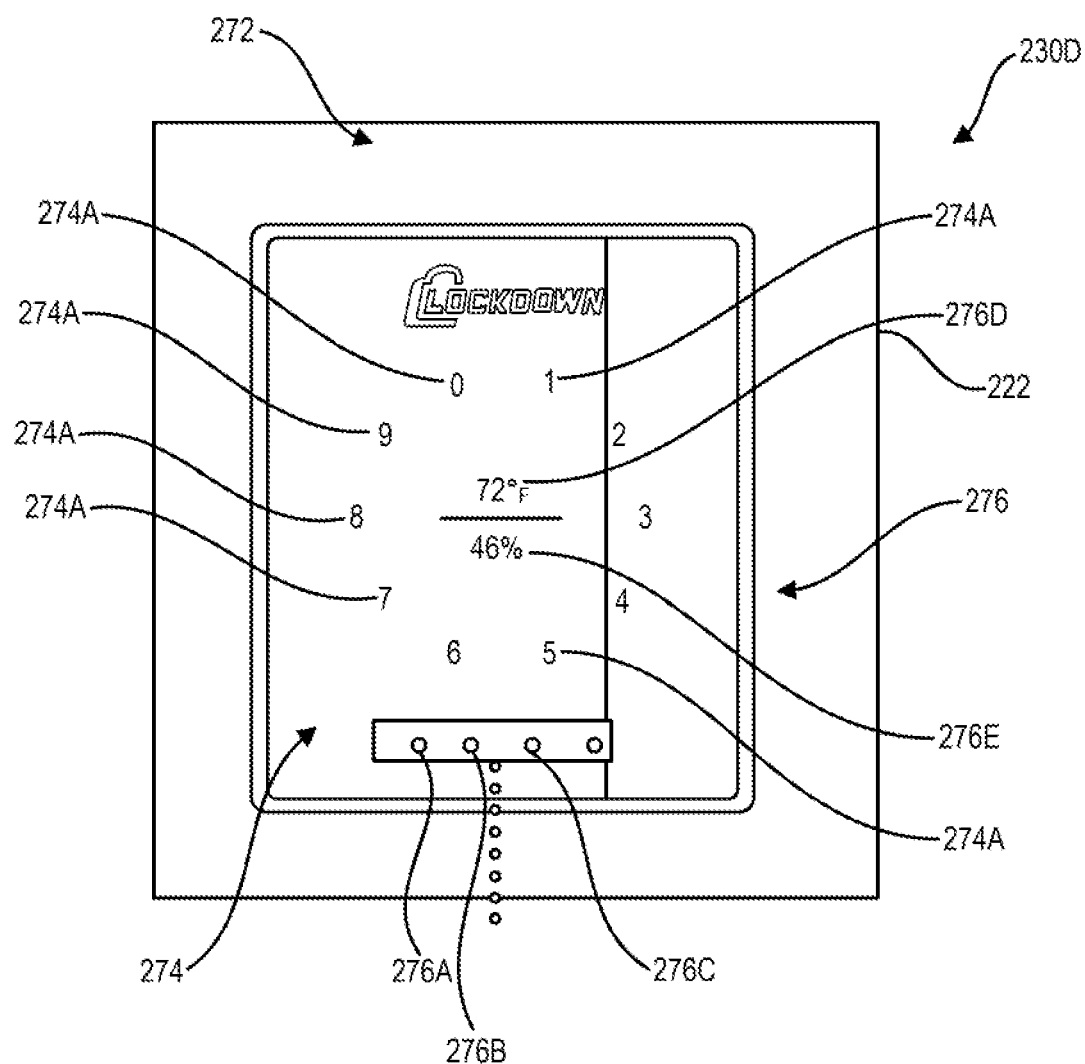
FIG. 21 is a front view of a user interface of the door of FIG. 20.
Figure 22:
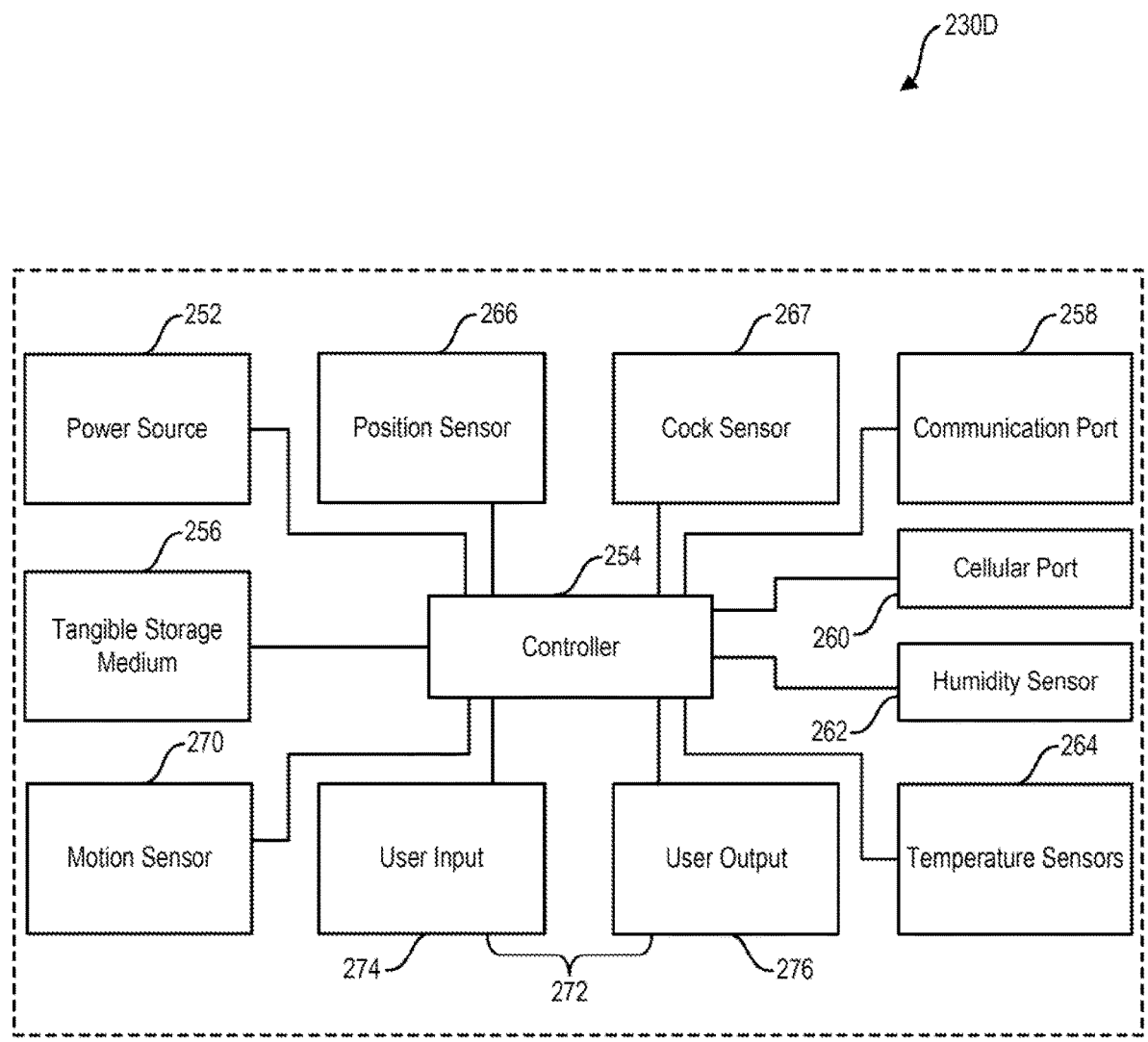
FIG. 22 is a schematic of a control system of the door of FIG. 20.

Referring to FIGS. 20-22, an example embodiment of a door assembly of the present disclosure is shown. The door assembly includes a door 222 hinged to a door frame 223. As explained above with reference to FIG. 1, the door 22 could be a vault door. As further explained above, the monitor 30D could be integrated with the door 22. The door 222 is a specific example of such an embodiment. The door assembly can be mounted in a wall opening such that the door serves as a door to a room of a building, such as a vault, etc. The door includes a monitor 230D having a user interface 272 on a front of the door. For example, the user interface can be used for entry of a code or combination for unlocking bolts of the door for permitting the door to be opened. It will be appreciated that the door 222 and door frame 223 could be part of a stand-alone cabinet-type vault, as explained above, without departing from the scope of the present disclosure.

The monitor 230D includes a power source 252, including an internal battery and/or electrical power port(s) configured to receive a power cable. In one example, the monitor includes a battery that serves as a backup power source, and includes electrical power ports on the front and rear of the door frame which may be used as a primary power source. For example, a power cord plugged into an electrical power outlet can be connected to a power port of the door assembly, or a power cord connected to terminals of a battery (e.g., 12 volt battery) can be plugged into a power port of the door assembly. When a source of power is connected to one of the power ports, the internal backup battery is charged and maintained in a charged state in case it is needed upon loss of the primary power source. Besides the internal battery, a battery could also be connected to one of the electrical power ports to serve as an additional backup power source.

The monitor 230D includes a monitor controller 254 (e.g., microprocessor or processor) and a tangible storage medium 256 storing processor-executable instructions for execution by the controller 254. For example, the tangible storage medium 256 can store instructions to connect the monitor 230D to the data communications network 40 when network availability is detected. The monitor 230D includes at least one communications port 258 configured to communicatively couple the monitor to the data communications network 40. For example, the port 258 could comprise a Wi-Fi transceiver for transmitting and receiving wireless data signals on the Wi-Fi network. The communications port 258 could comprise other types of wireless ports (e.g., Bluetooth, ZigBee, NFC, etc.) or wired ports (e.g., Ethernet, serial, etc.). Optionally, a cellular port 260 is also provided for communicatively coupling the monitor 230D to the cellular network 40C. The monitor 230D further includes a humidity sensor 262 and temperature sensor 264 (broadly, "environmental sensors") for sensing environmental temperature and humidity conditions proximate the door 222. The monitor 230D includes a position sensor 266 (e.g., built into the door 222) for sensing a position of the monitor 230D and thus the position of the door. For example, the position sensor 266 could be a Hall effect sensor, configured to sense a location of the sensor with respect to a magnet or reference 268 (FIG. 20) on the door frame 223. The position sensor 266 enables the monitor 230D to sense whether the door 222 is open or closed. Other types of position sensors could be used. The monitor 230D includes a motion sensor 270 configured to sense motion of the monitor and thus motion of the door 222 carrying the monitor. For example, the motion sensor 270 could comprise an accelerometer configured to detect vibration or other types of movement (e.g., acceleration) of the monitor. The monitor 230D can also include a lock sensor 267 configured to sense whether the door 222 is locked or unlocked (e.g., bolt(s) extended or retracted).

The user interface 272 of the monitor 230D comprises a user input 274 and a user output 276. In the illustrated embodiment, the user input 274 comprises a plurality of buttons 274A (broadly, "actuators") on the front of the monitor 230D. In the illustrated embodiment, the buttons comprise number buttons (e.g., 0 through 9) for entering a code to unlock the door 222. The buttons 274A could also be used to "arm" or "disarm" the monitor 230D to selectively put the monitor in an active state of monitoring. The user output 276 includes a plurality of indicators 276A-276E (e.g., LEDs or display sections). First, second, and third indicators 276A-276C can indicate things such as armed/disarmed, Wi-Fi connection, low battery, alarm state, or service needed. The indicator 276D indicates the current temperature sensed by the temperature sensor 264. The indicator 276E indicates the current humidity sensed by the humidity sensor 262. Other indicators can be provided. The user output 76 could also include an audio or visual alarm (e.g., speaker or light) configured to indicate an alarm state based on sensed data, such as motion, change of position, etc. For example, a speaker could "chirp" whenever the host door is opened and/or closed, and the speaker could emit an alarm sound when the monitor is armed and preset alarm conditions are detected (e.g., motion, door open, temperature or humidity out of range, etc.). Moreover, sensed data (e.g., locked/unlocked) can be recorded by the remote computer 38, sent to the user's communication terminal (e.g., text, email, other notification), and cause the remote computer 38 to control components of the system in various ways as explained above. The user can view real time and historical data associated with the monitor 230D on their communication terminal.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

It will be appreciated that the embodiments disclosed herein are by way of example and not limitation, and that deviations from the disclosed embodiments and features can be used without departing from the scope of the invention defined in the claims.

What is claimed is:

1. A security system for a premises, the security system comprising:
a data communications network, the data communications network including a wireless local area network at the premises and including a wide area network extending beyond the premises;
a host-carried security monitor carried by a host object at the premises for monitoring security data associated with the host object, the host-carried security monitor including a plurality of security data sensors, the plurality of security data sensors including at least a motion sensor and a position sensor, the motion sensor configured to sense motion of the host-carried monitor and thus motion of the host object, the position sensor configured to sense a position of the host-carried monitor relative to a reference, the host-carried security monitor including a wireless communication port connecting the host-carried security monitor to the wireless local area network, the host-carried security monitor including a security monitor controller and a security monitor non-transitory storage medium, the security monitor non-transitory storage medium storing instructions executable by the security monitor controller that, when executed by the security monitor controller, process security sensor data from at least one of the security data sensors to determine a security event and transmit a security event signal on the data communications network;
a security device at the premises and associated with the host-carried security monitor, the security device including at least one of an image sensor configured to capture image data, a motion sensor configured to detect motion in a field of view of the motion sensor, or a switch configured to selectively close to provide electrical power to an electronic device operatively connected thereto, the security device including a wireless communication port connecting the security device to the wireless local area network, the security device including a security device controller and a security device non-transitory storage medium; and
a server located remotely with respect to the premises and operatively connected to the wide area network, the server being in communication with the host-carried security monitor and the security device via the data communications network, the server including a security system processor and a security system non-transitory storage medium, the security system non-transitory storage medium storing instructions executable by the security system processor that, when executed by the security system processor, determine an action instruction based on the security event signal received on the data communications network from the host-carried monitor and transmit said action instruction to the security device;
wherein the security device controller is responsive to the action instruction from the server to cause the security device to perform a security action.

2. A security system as set forth in claim 1, wherein the security device is at least one of an electrical power switch, an electrical power outlet, a camera, or a host-carried security monitor.

3. A security system as set forth in claim 1, wherein at least one of:
the security monitor controller processes motion sensor data from the motion sensor to determine a motion security event and transmit a motion security event signal on the data communications network; or
the security monitor controller processes position data from the position sensor to determine a position security event and transmit a position security event signal on the data communications network,
wherein the security event signal comprises at least one of the motion security event signal or the position security event signal.

4. A security system as set forth in claim 1, wherein the security device comprises the image sensor, and the security device controller is responsive to the action instruction to cause the image sensor to capture image data.

5. A security system as set forth in claim 1, wherein the security device comprises the switch, and the security device controller is responsive to the action instruction to cause the security device to close the switch to provide electrical power to the electronic device or responsive to the action instruction to cause the security device to open the switch to cease providing electrical power to the electronic device.

6. A security system as set forth in claim 1, wherein the security device comprises an output, and the security device controller is responsive to the action instruction to cause the output to emit an audible alarm.

7. A security system as set forth in claim 1, wherein the host-carried security monitor comprises a humidity sensor, and wherein the security monitor controller processes humidity sensor data from the humidity sensor to determine a humidity exception, the security event signal being a humidity exception signal.

8. A security system as set forth in claim 1, further comprising a wireless communications terminal including a user interface, the wireless communications terminal including a communications terminal controller and a communications terminal non-transitory storage medium, the communications terminal non-transitory storage medium storing instructions executable by the communications controller that, when executed by the communications terminal controller, execute a graphic user interface on the user interface, the graphic user interface permitting a user to selectively modify the action instruction.

9. A security system as set forth in claim 8, wherein the server includes a database storing the action instruction, the server being responsive to user input at the graphic user interface to change the action instruction in the database, the security system processor referencing the database to determine said action instruction.

10. A security system for a premises, the security system comprising:

a data communications network, the data communications network including a wireless local area network at the premises and including a wide area network extending beyond the premises;

a security data monitor at the premises for monitoring security data at the premises, the security data monitor including at least one of a motion sensor, a position sensor, a temperature sensor, or a humidity sensor, the position sensor configured to sense a position of the security data monitor relative to a reference, the security data monitor including a wireless communication port connecting the security data monitor to the wireless local area network, the security data monitor including a security data monitor controller and a security data monitor non-transitory storage medium, the security data monitor non-transitory storage medium storing instructions executable by the security data monitor controller that, when executed by the security data monitor controller, process sensor data from said at least one of the motion sensor, position sensor, temperature sensor, or humidity sensor, to determine a security event and transmit a security event signal on the data communications network;

a security device at the premises and associated with the security data monitor, the security device including at least one of an image sensor configured to capture image data, a motion sensor configured to detect motion in a field of view of the motion sensor, or a switch configured to selectively close an electrical circuit to provide electrical power to an electronic device operatively connected thereto, the security device including a wireless communication port connecting the security device to the wireless local area network, the security device including a security device controller and a security device non-transitory storage medium; and a server located remotely with respect to the premises and operatively connected to the wide area network, the server being in communication with the host-carried security monitor and the security device via the data communications network, the server including a security system processor and a security system non-transitory storage medium, the security system non-transitory storage medium storing instructions executable by the security system processor that, when executed by the security system processor, determine an action instruction based on the security event signal received from the security data monitor via the data communications network, and transmit said action instruction to at least one of the security data monitor or security device;

wherein the non-transitory storage medium of said at least one of the security data monitor and security device stores instructions that, when executed by the respective security data monitor controller or security device controller, execute an action responsive to the action instruction from the server.

11. A security system as set forth in claim 10, wherein the security device is at least one of an electrical power switch, an electrical power outlet, a camera, or a host-carried security monitor.

12. A security system as set forth in claim 10, wherein the security device comprises the image sensor, and the security device controller is responsive to the action instruction to cause the image sensor to capture image data.

13. A security system as set forth in claim 10, wherein the security device comprises the switch, and the security device controller is responsive to the action instruction to cause the security device to close the switch to provide electrical power to the electronic device or responsive to the action instruction to cause the security device to open the switch to cease providing electrical power to the electronic device.

14. A security system as set forth in claim 10, wherein the security data monitor comprises an output, and the security data monitor controller is responsive to the action instruction to cause the output to emit an audible alarm.

15. A security system as set forth in claim 10, wherein the security data monitor comprises the humidity sensor, and wherein the security monitor controller processes humidity sensor data from the humidity sensor to determine a humidity exception, the security event signal being a humidity exception signal.

16. A security system as set forth in claim 10, further comprising a wireless communications terminal including a user interface, the wireless communications terminal including a communications terminal controller and a communications terminal non-transitory storage medium, the communications terminal non-transitory storage medium storing instructions executable by the communications controller that, when executed by the communications terminal controller, execute a graphic user interface on the user interface, the graphic user interface permitting a user to selectively modify the action instruction.

17. A security system as set forth in claim 16, wherein the server includes a database storing the action instruction, the server being responsive to user input at the graphic user interface to change the action instruction in the database, the security system processor referencing the database to determine said action instruction.

18. An electrical power switching control for selectively supplying electrical power to an electrical device, the electrical power switching control comprising:
 a housing;
 electrical connectors supported by the housing and configured to connect the electrical power switching control to a power grid;
 a switch configured to selectively close or open to close or open an electrical circuit to provide electrical power from the power grid to the electrical device;
 an actuator supported by the housing and operatively connected to the switch, the switch being responsive to user input via the actuator to selectively close the switch to close the circuit;
 a motion sensor supported by the housing, the motion sensor configured to sense motion in a field of view of the motion sensor;
 a wireless communication port supported by the housing, the wireless communication port configured to connect to a wireless data communications network;
 an electrical power switch controller and an electrical power switch non-transitory storage medium, the electrical power switch non-transitory storage medium storing instructions executable by the electrical power switch controller that, when executed by the electrical power switch controller, process data from the motion sensor to determine a security event and transmit a security event signal on the data communications network.

19. An electrical power switching control as set forth in claim 18, wherein the motion sensor comprises a microwave radar motion sensor.

20. A security monitoring system for a premises, the security monitoring system comprising:

the electrical power switching control of claim 18, said electrical connectors connected to the power grid;

a security device at the premises and associated with the electrical power switching control, the security device including at least one of an image sensor configured to capture image data, a motion sensor configured to detect motion in a field of view of the motion sensor, or a switch configured to selectively close an electrical circuit to provide electrical power to an electronic device operatively connected thereto, the security device including a wireless communication port connecting the security device to the wireless data communications network, the security device including a security device controller and a security device non-transitory storage medium; and a server located remotely from the premises and in communication with the electrical power switching control and the security device via the wireless data communications network, the server including a security monitoring system processor and a security monitoring system non-transitory storage medium, the security monitoring system non-transitory storage medium storing instructions executable by the security monitoring system processor, that when executed by the security monitoring system processor, determine an action instruction based on the security event signal received from the electrical power switching control via the wireless data communications network, and transmit said action instruction to at least one of the the electrical power switchhing control or the security device;

wherein the electrical power switch non-transitory storage medium stores instructions that, when executed by the electrical power switch controller, execute the action instruction from the server;

wherein the security device non-transitory storage medium stores instructions that, when executed by the security device controller, execute the action instruction from the server.

21. A security system as set forth in claim 1, wherein the host-carried security monitor comprises a temperature sensor, and wherein the security monitor controller processes temperature sensor data from the temperature sensor to determine a temperature exception, the security event signal being a temperature exception signal.

22. A security system as set forth in claim 1, wherein:
the security monitor controller processes motion sensor data from the motion sensor to determine a motion security event and transmit a motion security event signal on the data communications network; and
the security monitor controller processes position data from the position sensor to determine a position security event and transmit a position security event signal on the data communications network.

23. A security system as set forth in claim 1, wherein the host-carried security monitor includes a mount attaching the host-carried security monitor to the host.

24. A security system as set forth in claim 1, wherein the host-carried security monitor includes an indicator configured to indicate the location of the position sensor to a user.

25. A security system as set forth in claim 1, wherein the host-carried security monitor includes a user input configured to receive an input from a user and a user output configured to indicate status information to the user.

26. A security system as set forth in claim 8, wherein the instructions include instructions that, when executed by the security system process, determine a notification instruction based on the security event signal received on the data communications network from the host-carried monitor and transmit a notification instruction signal to the wireless communications terminal.

27. A security system as set forth in claim 5, further comprising the electronic device, wherein the electronic device comprises a light, a dehumidifier, or an electrical appliance.

28. A security system as set forth in claim 5, further comprising the electronic device, the electronic device comprising a dehumidifier.

29. A security system as set forth in claim 1, wherein the security device includes the image sensor, the motion sensor, and the switch.

30. A security system as set forth in claim 10, wherein said action instruction comprises a first action instruction and a second action instruction, the security system non-transitory storage medium storing instructions executable by the security system processor that, when executed by the security system processor, transmit said first action instruction to the security data monitor, and transmit said second action instruction to the security device.

31. A security system as set forth in claim 10, wherein at least one of:
the security data monitor controller processes motion sensor data from the motion sensor to determine a motion security event and transmit a motion security event signal on the data communications network;
the security monitor controller processes position data from the position sensor to determine a position security event and transmit a position security event signal on the data communications network;
the security monitor controller processes temperature data from the temperature sensor to determine a temperature security event and transmit a temperature security event signal on the data communications network; or
the security monitor controller processes humidity data from the humidity sensor to determine a humidity security event and transmit a humidity security event signal on the data communications network;
wherein the security event signal comprises at least one of the motion security event signal, the position security event signal, the temperature security event signal, or the humidity security event signal.

32. A security system as set forth in claim 10, wherein the security data monitor includes the motion sensor, the position sensor, the temperature sensor, and the humidity sensor, and wherein:
the security data monitor controller processes motion sensor data from the motion sensor to determine a motion security event and transmit a motion security event signal on the data communications network;
the security monitor controller processes position data from the position sensor to determine a position security event and transmit a position security event signal on the data communications network;
the security monitor controller processes temperature data from the temperature sensor to determine a temperature security event and transmit a temperature security event signal on the data communications network; and
the security monitor controller processes humidity data from the humidity sensor to determine a humidity security event and transmit a humidity security event signal on the data communications network;
wherein the security event signal comprises at least one of the motion security event signal, the position security event signal, the temperature security event signal, or the humidity security event signal.

33. A security system as set forth in claim 10, wherein the data security monitor includes at least one of an image sensor configured to capture image data, a motion sensor configured to detect motion in a field of view of the motion sensor, or a switch configured to selectively close an electrical circuit to provide electrical power to an electronic device operatively connected thereto.

34. A security system as set forth in claim 33, wherein the data security monitor includes the image sensor, the motion sensor, and the switch.

35. A security system as set forth in claim 33, wherein at least one of:
the data security monitor comprises the image sensor, and the data security monitor controller is responsive to the action instruction to cause the image sensor to capture image data; or
the data security monitor comprises the switch, and the data security monitor controller is responsive to the action instruction to cause the data security monitor to close the switch to provide electrical power to the electronic device operatively connected thereto or responsive to the action instruction to cause the data security monitor to open the switch to cease providing electrical power to the electronic device operatively connected thereto.

36. A security system as set forth in claim 10, wherein the data security monitor includes the position sensor, the data security monitor including an indicator configured to indicate the location of the position sensor to a user.

37. A security system as set forth in claim 10, wherein the data security monitor includes a user input configured to receive an input from a user and a user output configured to indicate status information to the user.

38. A security system as set forth in claim 13, further comprising the electronic device, wherein the electronic device comprises a light, a dehumidifier, or an electrical appliance.

39. A security system as set forth in claim 13, further comprising the electronic device, the electronic device comprising a dehumidifier.

40. A security system as set forth in claim 33, wherein the data security monitor comprises the switch, and the data security monitor controller is responsive to the action instruction to cause the data security monitor to close the switch to provide electrical power to the electronic device operatively connected thereto or responsive to the action instruction to cause the data security monitor to open the switch to cease providing electrical power to the electronic device operatively connected thereto;
the security system further comprising the electronic device operatively connected to the data security monitor, wherein the electronic device operatively connected to the data security monitor comprises a light, a dehumidifier, or an electrical appliance.

41. A security system as set forth in claim 33, wherein the data security monitor comprises the switch, and the data security monitor controller is responsive to the action instruction to cause the data security monitor to close the switch to provide electrical power to the electronic device operatively connected thereto or responsive to the action instruction to cause the data security monitor to open the switch to cease providing electrical power to the electronic device operatively connected thereto;
the security system further comprising the electronic device operatively connected to the data security monitor, wherein the electronic device operatively connected to the data security monitor comprises a dehumidifier.

42. A security system as set forth in claim 10, wherein the security device includes the image sensor, the motion sensor, and the switch.

43. An electrical power switching control as set forth in claim 18, wherein the electrical power switching control controller is responsive to an action instruction received from the data communication network to cause the electrical power switching control to close the switch to provide electrical power to the electrical device, or to cause the electrical power switching control to open the switch to cease providing electrical power to the electronic device.

44. An electrical power switching control as set forth in claim 18, further comprising an image sensor supported by the housing and configured to capture image data.

45. An electrical power switching control as set forth in claim 44, wherein the electrical power switching control controller is responsive to an action instruction received from the data communication network to cause the image sensor to capture image data.

46. An electrical power switching control as set forth in claim 18, further comprising a user input configured to receive an input from a user and a user output configured to indicate status information to the user, the user input and the user output supported by the housing.

47. An electrical power switching control as set forth in claim 18, in combination with the electrical device, wherein the electrical device comprises a light, a dehumidifier, or an electrical appliance.

48. An electrical power switching control as set forth in claim 18, in combination with the electrical device, wherein the electrical device comprises a dehumidifier.

49. A security monitoring system for a premises, the security monitoring system comprising:
the electrical power switching control of claim 18, said electrical connectors connected to the power grid; and
a server located remotely from the premises and in communication with the electrical power switching control via the wireless data communications network, the server including a security monitoring system processor and a security monitoring system non-transitory storage medium, the security monitoring system non-transitory storage medium storing instructions executable by the security monitoring system processor, that when executed by the security monitoring system processor, determine an action instruction based on the security event signal received from the electrical power switching control via the wireless data communications network, and transmit said action instruction to the electrical power switching control;
wherein the electrical power switch non-transitory storage medium stores instructions that, when executed by the electrical power switch controller, execute the action instruction from the server.

50. A security monitoring system as set forth in claim 49, wherein the electrical power switch controller is responsive to the action instruction received from the data communication network to cause the electrical power switching control to close the switch to provide electrical power to the electrical device, or to cause the electrical power switching control to open the switch to cease providing electrical power to the electronic device.

51. A security monitoring system as set forth in claim 49, further comprising a wireless communications terminal including a user interface, the wireless communications terminal including a communications terminal controller and a communications terminal non- transitory storage medium, the communications terminal non-transitory storage medium storing instructions executable by the communications controller that, when executed by the communications terminal controller, execute a graphic user interface on the user interface, the graphic user interface permitting a user to selectively modify the action instruction.

52. A security monitoring system as set forth in claim 51, wherein the server includes a database storing the action instruction, the server being responsive to user input at the graphic user interface to change the action instruction in the database, the security monitoring system processor referencing the database to determine said action instruction.

53. A security monitoring system as set forth in claim 51, wherein the security monitoring system non-transitory storage medium stores instructions that, when executed by the security monitoring system processor, determine a notification instruction based on the security event signal received on the data communications network from the electrical power switching control and transmit a notification instruction signal to the wireless communications terminal.

54. A security monitoring system as set forth in claim 20, wherein the security device is at least one of an electrical power switch, an electrical power outlet, a camera, or a host-carried security monitor.

55. A security monitoring system as set forth in claim 20, wherein the security device includes the image sensor, the motion sensor, and the switch.

56. A security monitoring system as set forth in claim 20, wherein the security device comprises the image sensor, and the security device controller is responsive to the action instruction to cause the image sensor to capture image data.

57. A security monitoring system as set forth in claim 20, wherein the security device comprises the switch, and the security device controller is responsive to the action instruction to cause the security device to close the switch of the security device to provide electrical power to the electronic device operatively connected thereto or responsive to the action instruction to cause the security device to open the switch of the security device to cease providing electrical power to the electronic device operatively connected thereto.

58. A security monitoring system as set forth in claim 20, wherein the security device comprises an output, and the security device controller is responsive to the action instruction to cause the output to emit an audible alarm.

59. A security monitoring system as set forth in claim 20, wherein the security device comprises a humidity sensor, and wherein the security device controller processes humidity sensor data from the humidity sensor to determine a humidity exception and transmit a humidity exception signal on the data communications network.

60. A security monitoring system as set forth in claim 20, wherein the security device comprises a temperature sensor, and wherein the security device controller processes temperature sensor data from the temperature sensor to determine a temperature exception and transmit a temperature exception signal on the data communications network.

61. A security monitoring system as set forth in claim 18, wherein the actuator comprises a push button, a toggle, or a capacitive touch sensor.

* * * * *